United States Patent [19]

Axberg et al.

[11] Patent Number: 6,009,466
[45] Date of Patent: Dec. 28, 1999

[54] NETWORK MANAGEMENT SYSTEM FOR ENABLING A USER TO CONFIGURE A NETWORK OF STORAGE DEVICES VIA A GRAPHICAL USER INTERFACE

[75] Inventors: Gary T. Axberg; David Lynn Merbach, both of Rochester, Minn.

[73] Assignee: International Business Machines Corporation, Armonk, N.Y.

[21] Appl. No.: 08/962,201

[22] Filed: Oct. 31, 1997

[51] Int. Cl.$^6$ ........................................... G06F 13/00
[52] U.S. Cl. ........................ 709/220; 709/223; 345/348
[58] Field of Search .................... 709/220, 221, 709/222, 223, 224, 225, 226, 213, 215; 707/102; 345/335, 339, 348, 356, 508

[56] References Cited

U.S. PATENT DOCUMENTS

| | | | |
|---|---|---|---|
| 5,257,201 | 10/1993 | Berman et al. | 364/489 |
| 5,394,522 | 2/1995 | Sanchez-Frank et al. | 345/349 |
| 5,408,603 | 4/1995 | Van de Lavoir et al. | 345/349 |
| 5,452,415 | 9/1995 | Hotka | 345/329 |
| 5,463,775 | 10/1995 | DeWitt et al. | 702/186 |
| 5,515,524 | 5/1996 | Lynch et al. | 395/500 |
| 5,546,595 | 8/1996 | Norman et al. | 710/10 |
| 5,548,722 | 8/1996 | Jalalian et al. | 709/220 |

FOREIGN PATENT DOCUMENTS 9534866  12/1995  European Pat. Off. ........ G06F 17/50

OTHER PUBLICATIONS

TME 10 NetView Concepts: A General Information Manual, Version 5 (Jun. 1997).
TME 10 NetView User's Guide for Beginners, Version 5 (Jun. 1997).
IBM Technical Disclosure Bulletin, vol. 38, No. 10, Oct. 1995, "Architecture for a Graphic Network Topology Interface", pp. 517–519.

Primary Examiner—Viet D. Vu
Attorney, Agent, or Firm—Roy W. Truelson

[57] ABSTRACT

A network configuration program assists a user in planning the configuration of devices in an information processing network. Preferably, a planning function is part of a storage management program for managing a network of storage devices. After specifying a set of hardware to be configured, the storage management program presents a graphical display representing available hardware. The user performs sequential configuration steps by selecting represented devices with a pointer, and designating ports or other information as required. For example, where connections between two devices are being specified, the user selects a first device with the pointer, drags a line to a second device, and selects the second device to indicate the connection. Because a typical network must satisfy numerous constraints, which are difficult for the user to keep in mind, the storage management program determines, from among the available devices, which ones can be connected to a selected device without violating any of the network constraints. These connectable devices are then highlighted on the graphical display so that the user can visually interpret the valious configuration options available at that stage. The display is updated at each configuration step, to reflect the cumulative steps completed at that point in the overall configuration task. Updating the display also reflects the available choices for the next configuration step. In this manner, a user without extensive knowledge of system and device constraints is guided through the configuration process.

18 Claims, 20 Drawing Sheets

NETWORK MANAGEMENT SYSTEM FOR ENABLING A USER TO CONFIGURE A NETWORK OF STORAGE DEVICES VIA A GRAPHICAL USER INTERFACE

FIELD OF THE INVENTION

The present invention relates generally to digital data processing, and more particularly to the management of networks of digital data storage devices.

BACKGROUND OF THE INVENTION

Modern computer systems have driven a demand for enormous amounts of data storage. Data traditionally has been stored in one or more mass data storage devices, such as rotating magnetic disk drives or tape drives, attached to a single computer system. As computer systems have become larger, faster, and more reliable, there has been a corresponding increase in need for storage capacity, speed and reliability of the storage devices. Increases in the data storage capacity and reliability of storage devices have been dramatic in recent years. But with all the improvements to the devices themselves, there are certain limitations to what can be accomplished. Additional configurations of storage devices have increasingly been offered in recent years to meet demand for larger capacity, faster, more reliable, and more accessible data storage.

One example of alternative configurations is the rapidly increasing popularity of so-called "RAIDs", i.e., redundant arrays of independent disks. A RAID stores data on multiple storage devices in a redundant fashion, such that data can be recovered in the event of failure of any one of the storage devices in the redundant array. RAIDs are usually constructed with rotating magnetic hard disk drive storage devices, but may be constructed with other types of storage devices, such as optical disk drives, magnetic tape drives, floppy disk drives, etc. Various types of RAIDs providing different forms of redundancy are described in a paper entitled "A Case for Redundant Arrays of Inexpensive Disks (RAID)", by Patterson, Gibson and Katz, presented at the ACM SIGMOD Conference, June, 1988. Patterson, et al., classify five types of RAIDs designated levels 1 through 5. The Patterson nomenclature has become standard in the industry.

Another example of a storage alternative is the concept of a storage subsystem. A storage subsystem implies a greater degree of independence from a host computer system than is typically found in an isolated storage device. For example, the subsystem may be packaged in a separate cabinet, with its own power supply, control software, diagnostics, etc. The subsystem may have a single storage device, but more typically contains multiple storage devices. The notion of a storage subsystem and a RAID are not necessarily mutually exclusive; in fact, many RAIDs are constructed as semi-independent storage subsystems, which communicate with a host through a communication link having a defined protocol. It is possible in such subsystems that the host is not even aware of the existence of multiple data storage units or data redundancy in the storage subsystem. To the host, the subsystem may appear to be a single very large storage device.

A configuration of multiple storage devices need not be attached to only a single host computer system. It might be that multiple computer systems are configured to share multiple storage devices. Thus, configurations of storage devices can be generalized to the concept of a storage network.

As used herein, a storage network is a configuration of multiple data storage devices, connected to one or more host computer systems, such that there is a communication path from each storage device to each host system which does not cross the system bus of another host system. Because there exists a direct communication path from each system to each storage device, data on any device is readily accessible to any of the systems. Storage devices in a storage network are not necessarily identified with or controlled by a host. This latter feature distinguishes a storage network from a simple network of computer systems, each having its own local storage devices. Thus, in certain computing environments, a storage network facilitates sharing of data and improved performance over a conventional network of host systems.

While it is theoretically possible to construct complex storage networks shared among multiple host computer systems using prior art hardware, in reality this is an error-prone and difficult task. Documentation and software support may be primitive or non-existent. A user must determine how to operate, configure and attach devices. Optimum physical configurations may depend on logical configurations and modes of operation, such as one or more RAID levels. There may be numerous hardware dependencies and limitations, such as number and type of devices that may communicate with a single I/O controller or adapter. All these requirements place substantial demands on the expertise of the user. It would be desirable to support the construction of storage networks with software which assists the user.

SUMMARY OF THE INVENTION

It is therefore an object of the present invention to provide an enhanced method and apparatus for configuring an information processing network.

Another object of this invention is to enhance the capability of an user to configure a network of storage devices attached to one or more computer systems.

Another object of this invention is to provide an enhanced method and apparatus for storing data in a computer system.

Another object of the invention is to provide more flexible storage for a computer system.

Another object of the invention is to provide increased guidance for a user in configuring an information processing network.

Another object of the invention is to reduce the likelihood of error when planning a configuration of an information processing network.

A network configuration program executing on a computer system assists an user in planning the configuration of devices in an information processing network. In the preferred embodiment, a planning function is part of a storage management program for managing a network of storage devices. The user first selects a set of hardware to be configured in a storage network. The storage management program presents a graphical display representing available hardware. A configuration task for each individual bus of the storage network is performed as a series of configuration steps, each specifying a connection, logical address, or the like. Preferably, each step specifies a single bi-directional connection between two devices. To accomplish this, the user selects one of the represented devices on the display with a pointer, designates a port as necessary, makes an appropriate connection or other association with another device, and may designate a connecting port. For example, where connections between two devices are being specified, the user selects a first device with the pointer, drags a line to a second device, and selects the second device to indicate the connection.

Typically, a network must satisfy numerous constraints. For example, the number of devices on a single bus, the number of ports in a device, the port numbers assigned, the gross data capacity of a communications link, the compatibility of different types of devices, and other factors, may have to be satisfied simultaneously. It is difficult for the user to keep all these things in mind. Preferably, once the first device is selected, the storage management program determines, from among the available devices, which ones can be connected to the selected device without violating any of the network constraints. These connectable devices are then highlighted on the graphical display so that the user can visually interpret the various configuration options available at that stage. The storage management program will not permit an user to perform an invalid configuration step. The display is updated at each configuration step, to reflect the cumulative steps completed at that point in the overall configuration task. Updating the display also reflects the available choices for the next configuration step. In this manner, an user without extensive knowledge of system and device constraints is guided through the configuration process.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

A storage network management program includes a configuration planning portion for planning the configuration of a storage network. The storage management program preferably performs other functions, such as monitoring the storage network, when fully configured and all devices are attached. As a preliminary matter, it is necessary to understand the essential elements of a configured storage network in accordance with the preferred embodiment.

Figure 1:
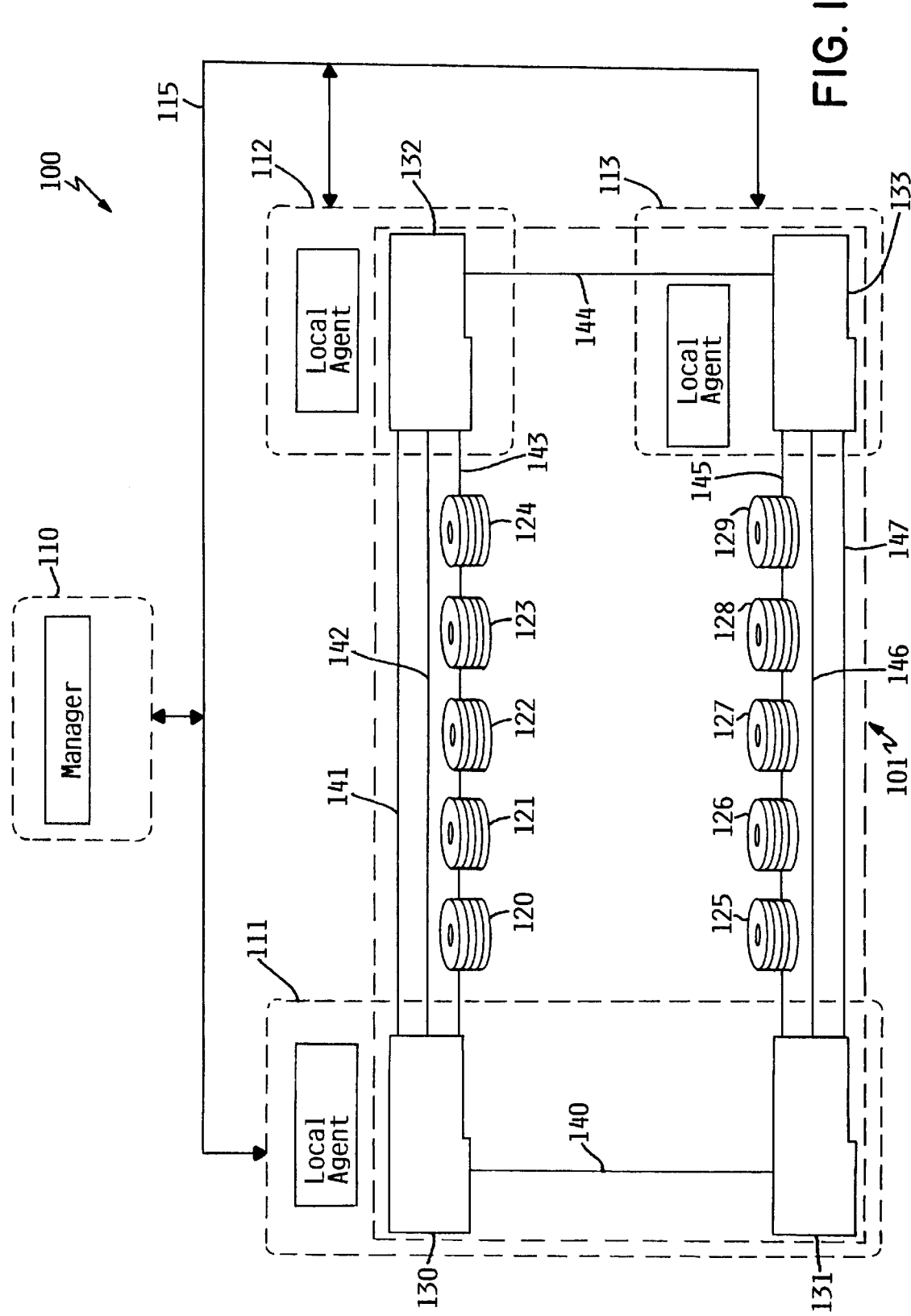
FIG. 1 is a high level diagram of an interconnected network of computer systems utilizing a storage network, in accordance with the preferred embodiment of the present invention.

FIG. 1 illustrates at a high level a typical interconnected network of computer systems (information processing network) utilizing a storage network, in accordance with the preferred embodiment of the present invention. Information processing network 100 comprises host computer systems 110–113, which communicate with each other via network communication medium 115. In the preferred embodiment, network communication medium 115 is a wired local area network (LAN) using an IBM Token Ring protocol, it being understood that communications media of other types and protocols could be used. Host systems 111–113 store data in storage network 101. Storage network 101 comprises storage devices 120–129, which are coupled to network storage controllers 130–133 via communications links 140–147, as shown. Each host system 111–113 connected directly to storage network 101 contains at least one respective storage controller; host system 111 contains two network storage controllers 130,131. Host system 110 is not directly connected to storage network 101 in this example. Host system 110 performs the function of managing storage network 101.

Figure 2A:
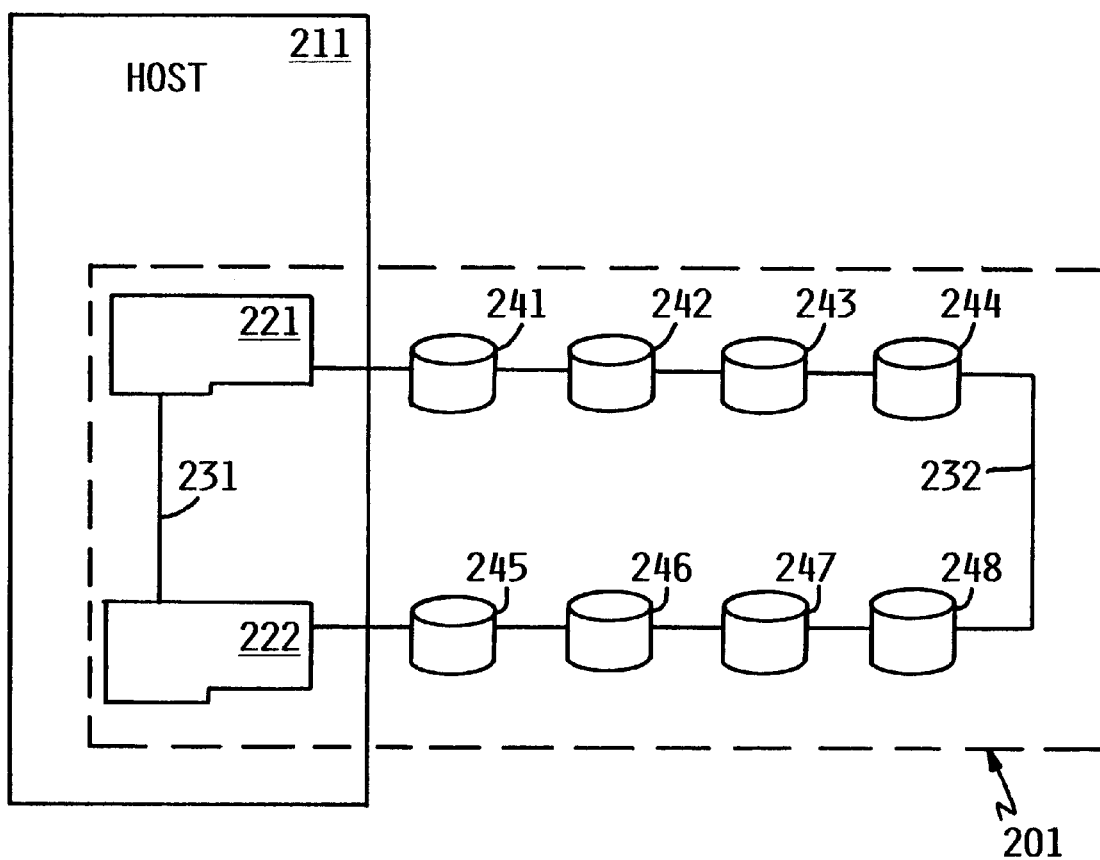
FIG. 2A is a high level diagram of an alternative example of a storage network configuration, wherein a single network serves a single host computer system, according to an alternative embodiment of the present invention.
Figure 2B:
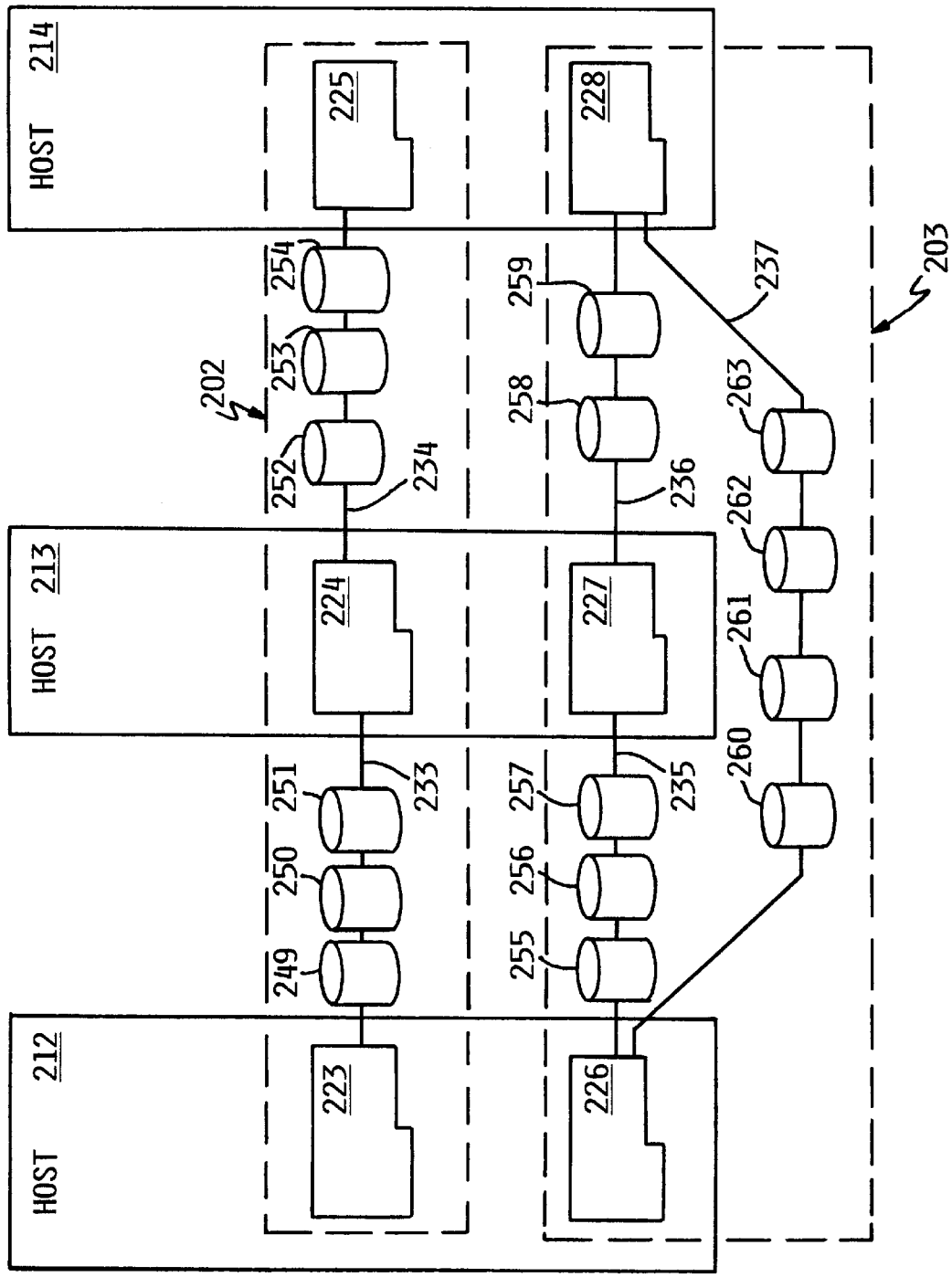
FIG. 2B is a high level diagram of another alternative example of a storage network configuration, wherein multiple storage networks serve multiple host computer systems, according to an alternative embodiment.

As explained above, a storage network as used herein is an interconnected group of storage devices and controllers, in which connections do not cross a host's system (backplane) bus. Controller-to-controller communication takes place via the storage interface itself. Storage network 101 is merely an illustrative example of one possible configuration of storage network. FIGS. 2A, and 2B illustrate at a high level various alternative configuration examples of storage networks in accordance with the preferred embodiment of the present invention. FIG. 2A illustrates the case where a single storage network 201 is connected to a single host computer system 211. Storage network 201 comprises storage controllers 221,222, which communicate via links 231,232 with storage devices 241–248.

FIG. 2B illustrates a further alternative storage network configuration, in which multiple storage networks 202,203 are connected to multiple host computer systems 212–214. Storage network 202 comprises storage controllers 223–225, which communicate via links 233–234 with storage devices 249–254. Storage network 203 comprises storage controllers 226–228, which communicate via links 235–237 with storage devices 255–263. It will be observed that storage network 203 is connected in a loop, which provides redundancy in case any single communications link fails, while storage network 202 is configured in a non-redundant fashion.

In the preferred embodiment, communication links 140–147 comprise wired connections using the IBM Serial Storage Architecture (SSA) communications protocol. In this protocol, each connection is dedicated, bidirectional connection between two devices. Because links typically do not exist between every possible pair of devices, data being transferred from one device to another may have to pass through multiple links and devices. The failure of a single device or link would break such a communication path. For this reason, it is desirable, although not required, to arrange such SSA networks in loops, which are inherently redundant. It should be understood, however, that other protocols could be used, including protocols which imply different connection topologies. For example, a bus-based protocol (such as SCSI) in which all devices are connected to a common communication carrier (bus), and arbitrate for control of the bus, could be used.

Typically, storage devices 120–129, 241–263, are rotating magnetic hard disk drive storage devices, sometimes also called "direct access storage devices", or DASD. However, storage devices 120–129, 241–263 could be other types of mass data storage devices, such as magnetic tape, optical disk, floppy disk, etc. Additionally, within any single network the storage devices may be a heterogeneous collection of storage devices of differing types, capacities, and other characteristics. Similarly, controllers 130–133, 221–228, communication links 140–147, 231–237 and hosts 110–113, 211–214 may be of the same type, or may be of mixed characteristics.

It will be understood that the storage network configurations shown in FIGS. 1, 2A and 2B are merely illustrative of a few different types of configurations, and are not intended as an exhaustive compilation of the different configurations possible. The number of host systems, I/O controllers, buses, and storage devices may vary considerably. Devices may be connected in redundant or non-redundant fashion. Controllers and buses may support connections to other devices.

Figure 3:
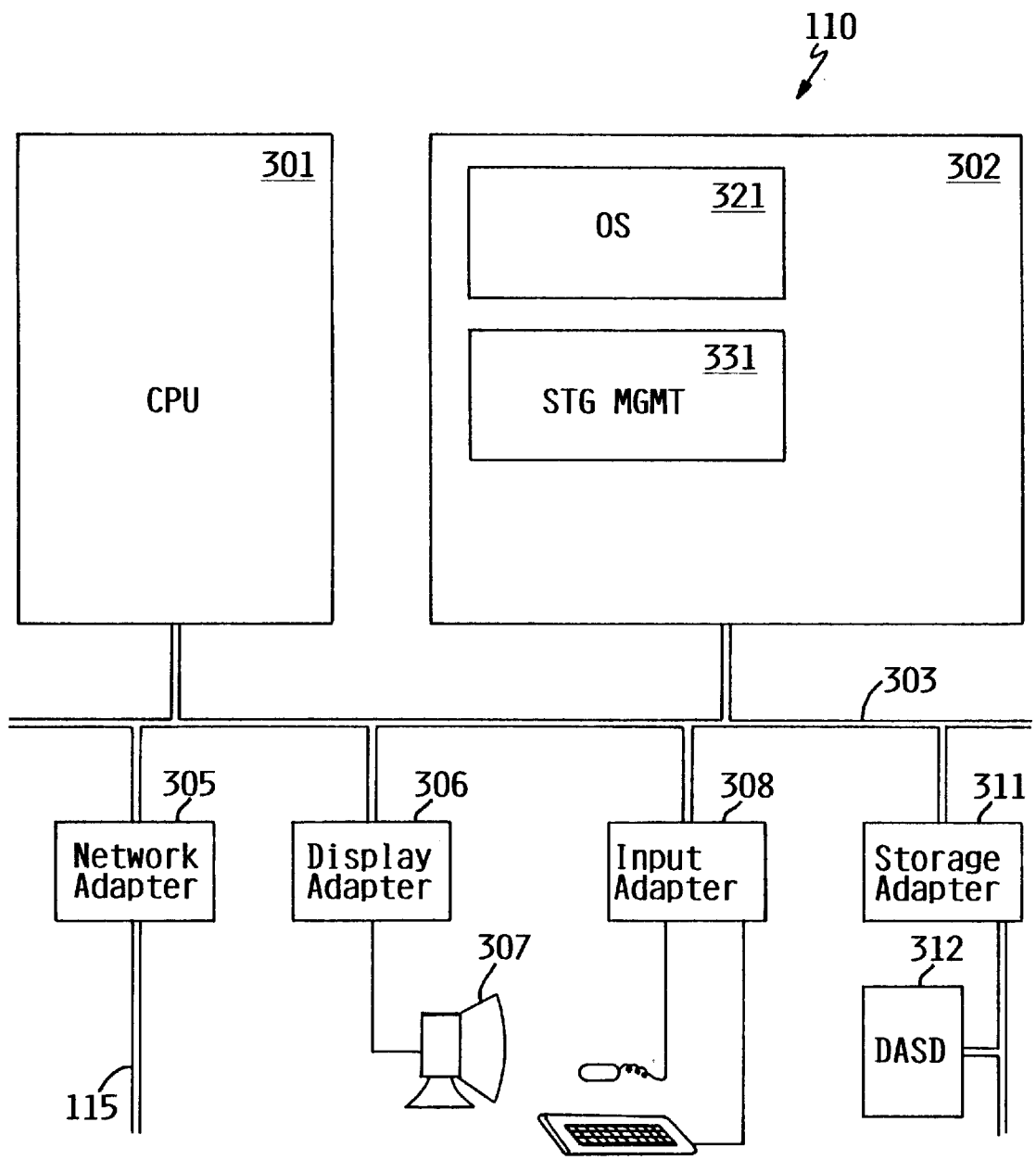
FIG. 3 illustrates in greater detail a host computer system which functions as the manager of a storage network, in accordance with the preferred embodiment of the present invention.

In the preferred embodiment, one of the host computer systems functions as a storage network manager, while the other systems function as agents of the network manager. Host system 110 is designated as the system which functions as a storage network manager. FIG. 3 is a block diagram showing the major components of host system 110 in accordance with the preferred embodiment. Central processing unit (CPU) 301 and system memory 302 are coupled to system bus 303. Bus 303 is used for communicating data among various components of system 110. Network adapter 305 coupled to system bus 303 is connected to network communications medium 115, allowing system 110 to communicate with other systems in the information processing network. Display adapter 306 coupled to bus 303 drives visual display 307 for displaying information to a user. Display 307 is preferably a cathode ray tube display, although other types may be used. Input adapter 308 receives input from an user through one or more input devices, such as keyboard 309 or mouse 310, it being understood that other input devices could be used. Local storage adapter 311 communicates with disk drive storage device 312 for storing data local to system 110. In the preferred embodiment, system 110 is an IBM Personal Computer, it being understood that other types of computer system could be used. It should further be understood that the major components shown above are by way of example, and many different configurations are possible.

Operating system 321 is stored in system memory 302 of system 110. In the preferred embodiment, operating system 321 is a Microsoft Windows 95 operating system, it being understood that other operating systems could be used. Also contained in memory 302 is a master portion of storage management program 331. Storage management program 331 is used to manage storage network 101. Program 331 runs in the environment of operating system 321, and preferably performs display related graphical user interface functions through operating system calls. While operating system 321 and program 331 are shown conceptually in FIG. 3 stored in system memory 302, it will be understood by those skilled in the art that typically the full program code will be stored in mass storage such as disk drive device 312, that only a portion of such programs may be resident in memory at any one time, and that program segments are loaded into memory 302 from storage as needed.

While in the preferred embodiment, the master portion of storage management program 331 resides on a host system separate from the storage network 101, it would alternatively be possible for storage management program 331 to reside in one of the host systems directly connected to storage network 101.

Figure 4:
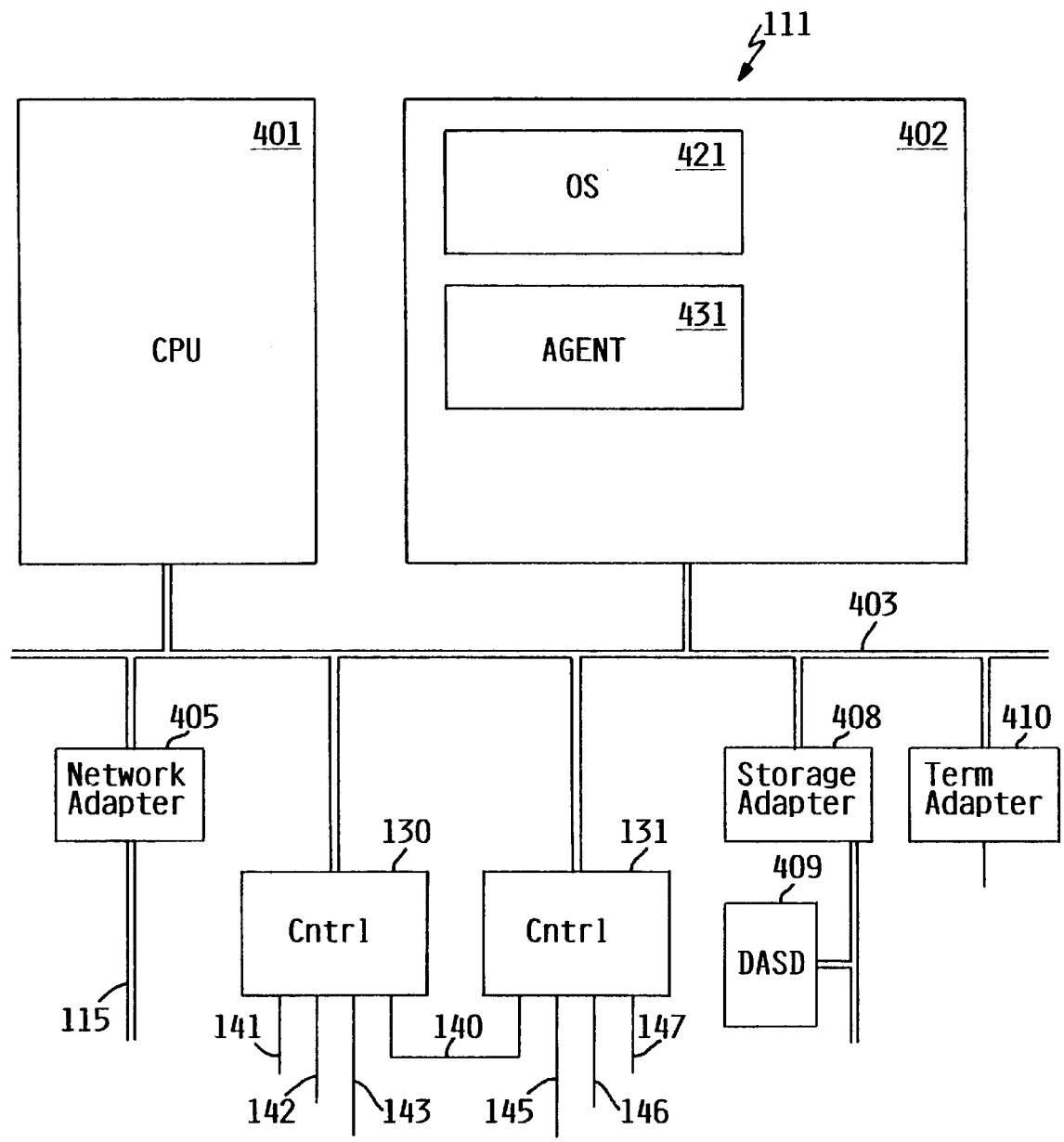
FIG. 4 illustrates in greater detail a host computer system attached directly to a storage network, in accordance with the preferred embodiment of the present invention.

In the preferred embodiment, host systems 111–113 which are directly connected to storage network 101 execute agent portions of the storage management program. FIG. 4 is a block diagram showing the major components of a typical host system 111, which is directly connected to network 101, in accordance with the preferred embodiment. Central processing unit (CPU) 401 and system memory 402 are coupled to system bus 403. Bus 403 is used for communicating data among various components of system 111. Network adapter 405 coupled to system bus 403 is connected to network communications medium 115, allowing system 111 to communicate with other systems in the information processing network.

Network storage I/O controllers 130 and 131 are coupled to bus 403 for communicating with other components of host system 111. Controllers 130,131 additionally are coupled to similar controllers in hosts 112,113, and to storage devices 120–129, through communication links 140–147, which collectively form network 101.

Additional devices may be coupled to system bus 403. For example, local storage adapter 408 is coupled to bus 403, for enabling communication with another (local) disk drive storage device 409. Terminal adapter 410 enables communication with an interactive user terminal (not shown). The configuration shown in FIG. 4 is by way of example only, and other devices (not shown) may also be connected. In the preferred embodiment, host system 111 is an IBM RS/6000 computer system, it being understood that other computer systems could be used.

It will be observed in FIG. 4 that SSA link 140 connects I/O controllers 130 and 131 directly, without going through system bus 403, and this connection is therefore part of storage network 101. On the other hand, local storage adapter 408 and device 409 have no direct connection to storage network 101. While it is theoretically possible to transfer data from device 409 to one of devices 120–129 or to another host system, such a transfer would be through system bus 403. Therefore, adapter 408 and storage device 409 are not included in storage network 101.

Operating system 421 is stored in system memory 402 of system 111. In the preferred embodiment, operating system 421 is an IBM AIX operating system, it being understood that other operating systems could be used with appropriate hardware. Also contained in memory 402 is an agent portion of storage management program 431. In the preferred embodiment, agent portion 431 is a part of the storage management program which performs data gathering and monitoring functions. For example, agent portion can poll hosts and I/O controllers to determine the existing topology of a storage network, can monitor and report error conditions, etc. These functions are not essential to an understanding of the storage network configuration planning function more fully described herein, and in an alternative embodiment of the present invention it would be possible to dispense with agent portion 431. While operating system 421 and program 431 are shown conceptually in FIG. 4 stored in system memory 402, it will be understood by those skilled in the art that typically the full program code will be stored in mass storage, and appropriate portions loaded into memory 403 from storage as needed.

The configuration planning function of the storage network management program will typically be performed before a storage network is constructed, i.e., physically connected together, although it is optionally possible to use the configuration planning function for adding to or altering an existing storage network. At this stage, host system 110 may be an isolated system, not connected to any network, or it may be connected to an information processing network via medium 115 as shown in FIG. 1, but without a storage network yet connected.

In the preferred embodiment, storage management program 331 is implemented in object-oriented programming code. This implementation facilitates the manipulation of objects displayed on a visual display as well as the interconnecting relationships between different representations of physical objects which make up the network. While the description below is directed to this implementation, it will be understood by those skilled in the art that the storage management functions could have been implemented in conventional procedural programming code, or using other programming paradigms.

Figure 5A:
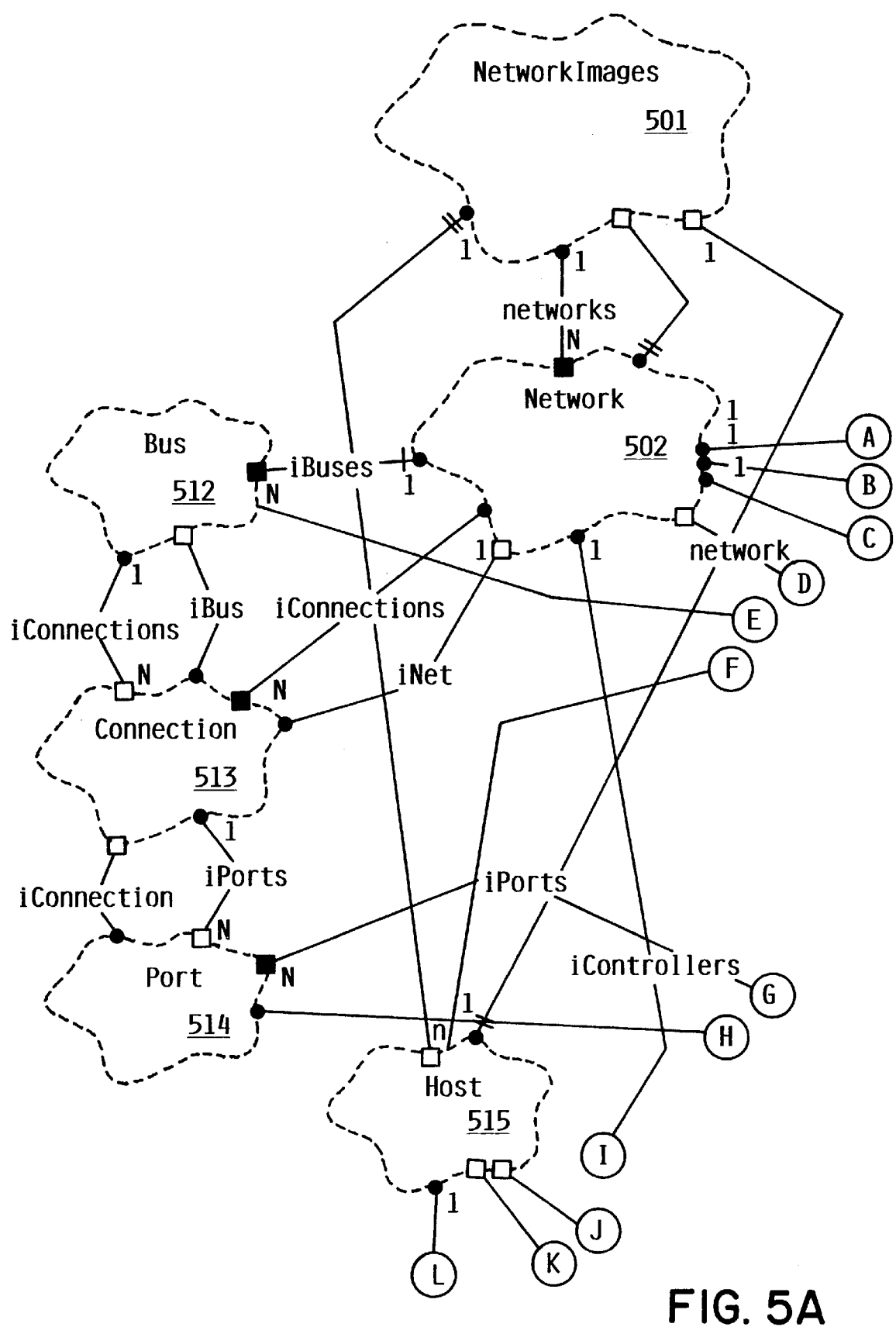
FIG. 5 illustrates a high level view of the class library objects for logically representing storage networks, in accordance with the storage management program of the preferred embodiment.
Figure 5B:
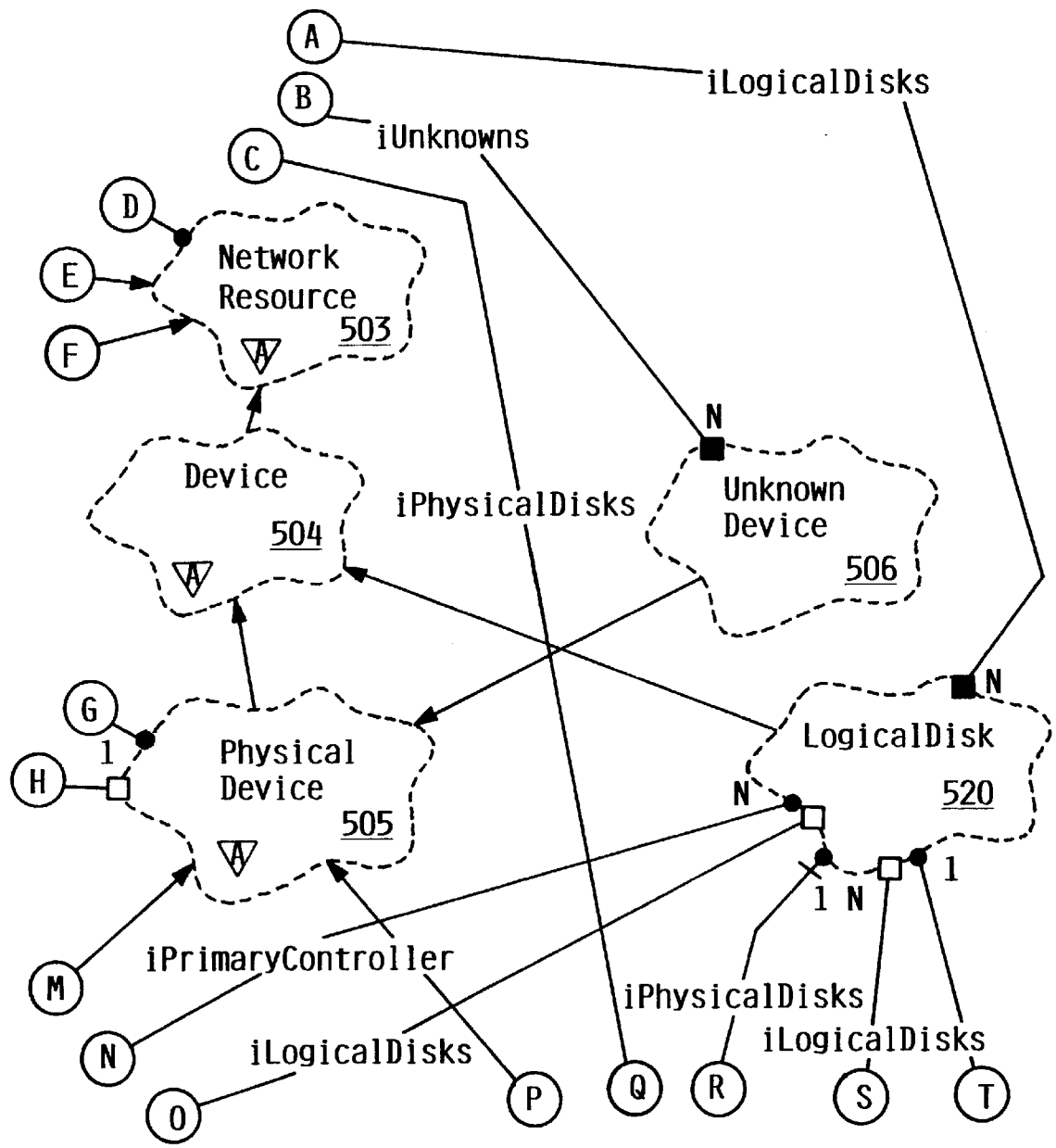
Figure 5C:
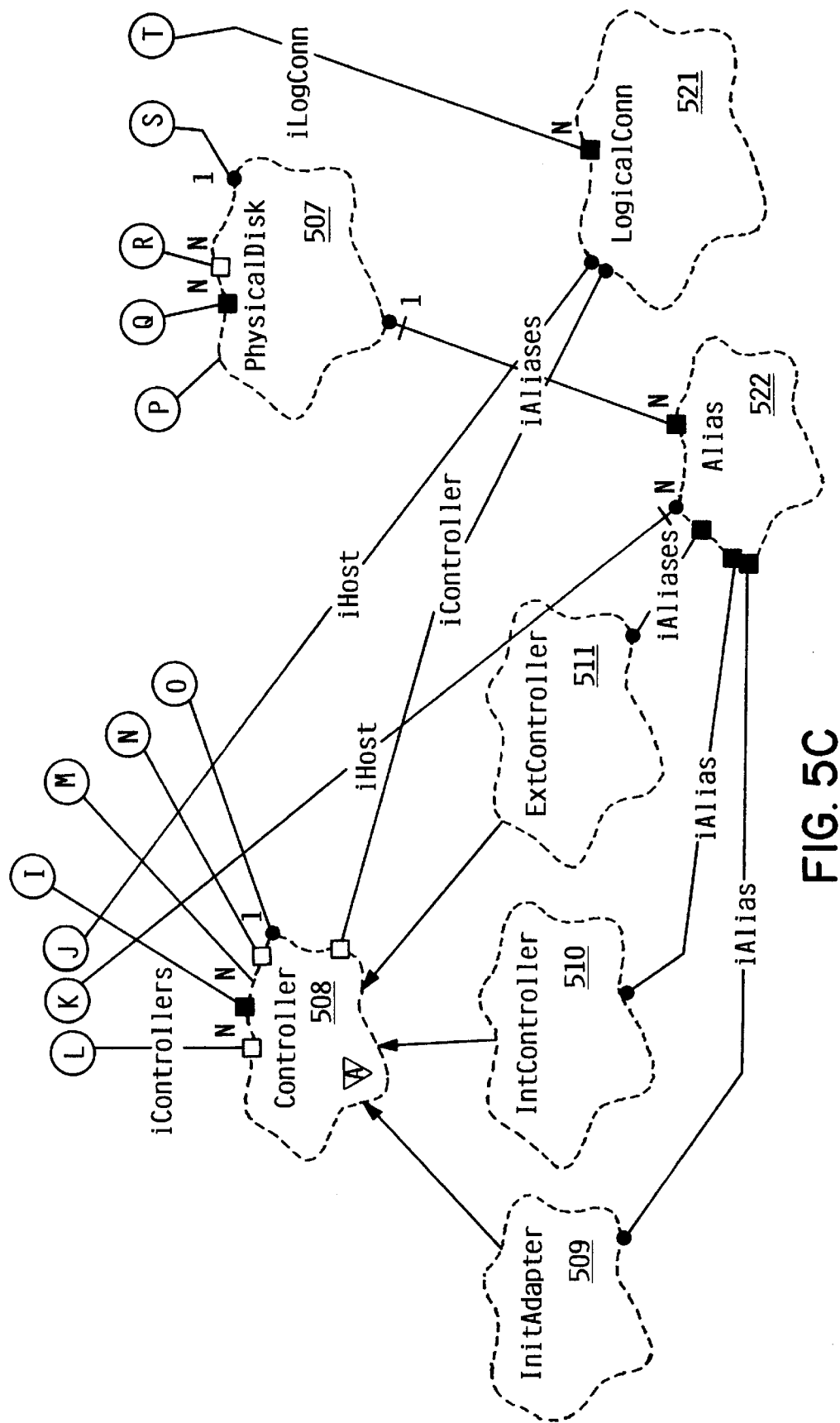

FIG. 5 illustrates a high level view of the class library objects of the storage management program of the preferred embodiment. FIG. 5 uses a notational system known as "Booch notation". This system is generally known among those skilled in the art of object-oriented programming. An explanation of the Booch notational system can be found in Booch, *Object-Oriented Analysis and Design With Applications*, 2nd ed. (Benjamin/Cummings Publishing Co., 1994), at Chapter 5, pp. 171–228. In FIG. 5, certain class relationships (which are actually containment by value) are depicted as contained by reference for ease of understanding. The actual code uses containment by value for reasons of performance, it being understood that it would be possible to write the code as either containment by value or by reference.

NetworkImages class 501 holds the objects which make up the current management set. The management set can be thought of as the global set of objects capable of being manipulated and configured by storage management program 331. It is possible to save and store multiple management sets, but only one set is worked upon at any one time. The management set may contain one or more storage networks. When program 331 is initiated, it creates a single NetworkImages object. Methods can then be invoked to populate the NetworkImages object. E.g., the method open( ) populates NetworkImages with a previously saved management set. Alternatively, methods can be called to create objects (Hosts, PhysicalDisks, etc.) one at a time. All Device objects are added and removed using the add( ) and remove( ) methods, respectively. The program determines which Network object the Device object belongs in and places it in the appropriate Network.

Network class 502 is a container (collection) class for all of the primary objects (PhysicalDisks, Controllers, LogicalDisks, Hosts, UnknownDevices, Connections and Buses) contained in a single network image. The Network class corresponds to a single storage network. It is possible to have multiple Network objects in a single Networkimages object (i.e., multiple storage networks in a single management set).

NetworkResource class 503 is an abstract base class which is used to provide an interface for classes that inherit from it. This class serves as the base class for the Host, Bus and Device classes. Although many of the object representing network resources could be lumped into a collection of NetworkResources or Devices, they are kept in separate collections for each device class, i.e., LogicalDisk, PhysicalDisk, etc. This provides some efficiencies when searching for particular objects or types of objects.

Device class 504 is an abstract base class which is used to provide a consistent interface for the devices that inherit from it. Device class 504 along with PhysicalDevice class 505 support extensibility. For example, if a magnetic tape device were to be added to the collection of devices configurable in a storage network, the new class could inherit from PhysicalDevice class 505, and thus maintain an interface consistent with other devices. Device class 504 groups all the functions that don't require a distinction between physical and logical device, e.g. serialNumber( ), name( ), and state( ).

PhysicalDevice class 505 is also an abstract base class which provides a common interface for physical (as opposed to logical) devices, e.g., Controller, PhysicalDisk, and UnknownDevice. Because every physical device has ports or connectors which are used to connect the device to other physical devices, PhysicalDevice class 505 contains at least one Port object by value. These Port objects are used to make connections to other PhysicalDevice objects. It is PhysicalDevice objects (representing physical devices) as opposed to LogicalDevice objects that the storage management program configures by forming connections therebetween.

PhysicalDisk class 507 is used to define a PhysicalDisk object, and is derived from the NetworkResource, Device and PhysicalDevice classes. PhysicalDisk objects represent rotating magnetic hard disk drive storage devices. In the preferred embodiment, disk drives are the only type of storage device supported for the network, although it would be possible as noted above to extend the application to other types of devices.

Controller class 508 is an abstract base class which provides a common interface for different types of objects representing I/O controllers. Controller class 508 is derived from NetworkResource 503, Device 504 and PhysicalDevice 505 classes. The classes ExtController, IntController and InitAdapter (representing external controllers, internal controllers, and initiator adapter cards, respectively) inherit from Controller class 508.

ExtController class 511 is derived from Controller class 508 and is used to represent controllers that are physically contained outside of a host system. For example, an external controller may be a RAID controller which is located in a separate storage subsystem housing having multiple storage devices and supporting hardware.

IntController class 510 is derived from Controller class 508 and is used to represent most I/O controllers of the type that are physically mounted within a host system, and typically connected directly to the host system's backplane bus.

InitAdapter class 509 is derived from Controller class 508 and is used to represent initiator adapters, i.e. I/O controllers which reside within a host system for connecting the host system to an external controller.

Bus class 512 is used to contain a group of Connection objects that are contained on a single loop or string (bus) using the SSA protocol.

Figure 8A:
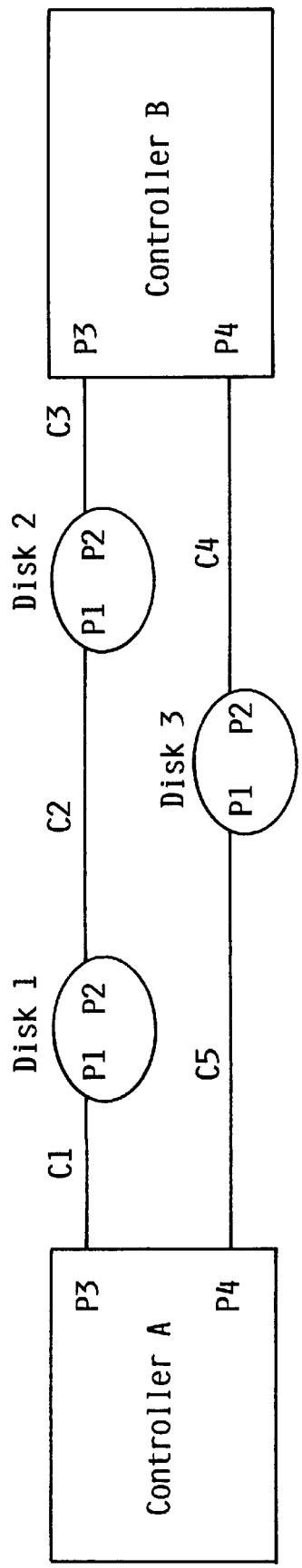
FIG. 8A shows a simple storage network loop configuration example.
Figure 8B:
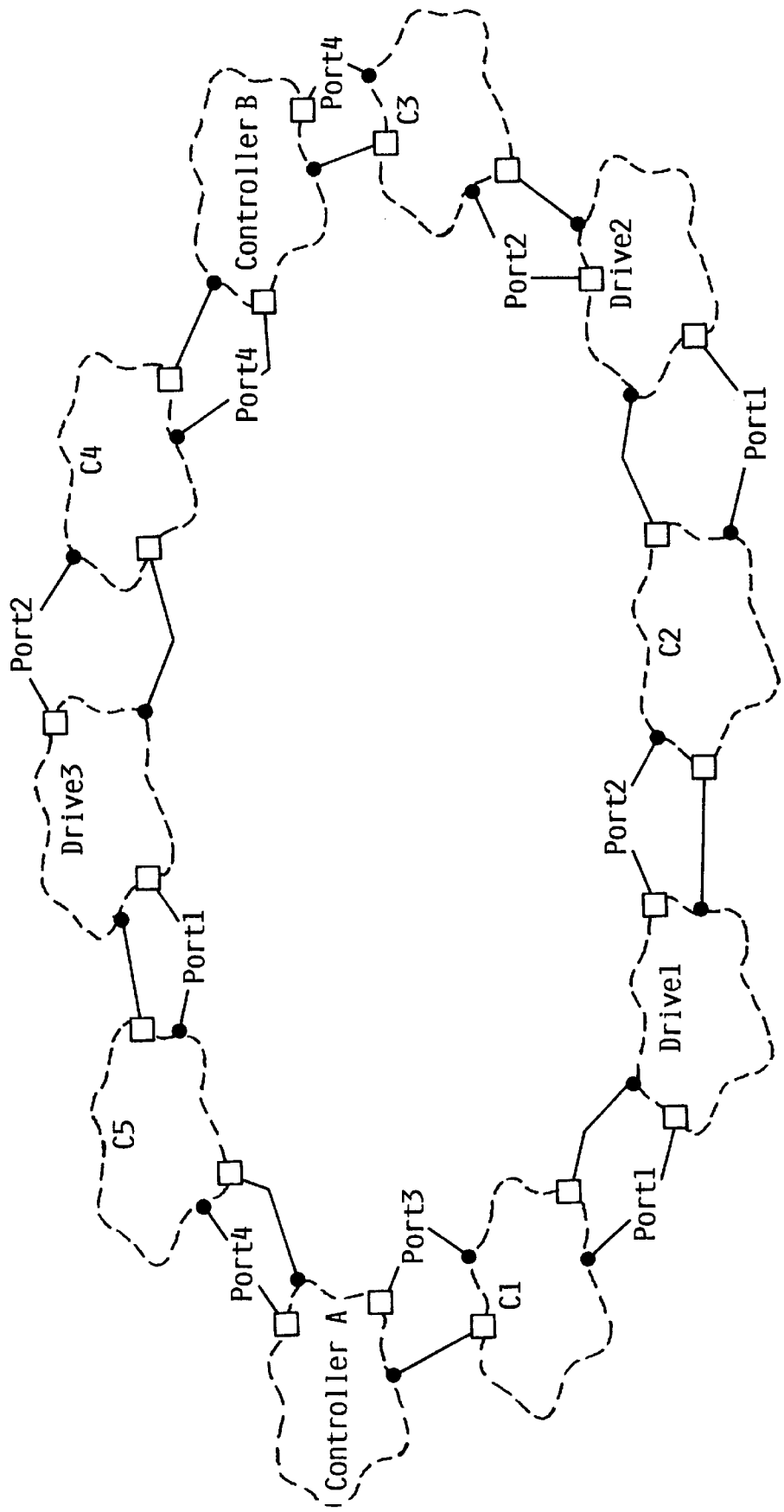
FIG. 8B is an object diagram showing the object representation of the storage network loop of FIG. 8A, according to the preferred embodiment.

Connection class 513 is used to provide information on the bus or link that is connecting PhysicalDevice objects. For the SSA protocol, a Connection object represents a single bi-directional link that joins two physical devices together. The Connection class contains one or more Port objects (described below). The Port class has a reference to a PhysicalDevice and contains an identifier which is used to store the port number that is associated with the port. For the SSA protocol, each Connection object contains two Port objects. FIG. 8A illustrates an example of a simple SSA storage network having two controllers and three disk drives. Each link is considered a connection. The connections are labeled C1 through C5. FIG. 8B shows an object diagram for the network of FIG. 8A., relating the Connection objects to the PhysicalDevice objects. All of the references with a PortX label and the Port object contained inside the Connection class. For example, Connection 5 (C5) is connected to Port4 of ControllerA and Port1 of Disk3.

Port class 514 is contained by value inside of a concrete PhysicalDevice class. A Port object is used to contain the information on the location of a port by containing a reference to the corresponding PhysicalDevice and an identifier. The identifier stores the port number.

Host class 515 is used to define a host system, i.e., a system in which at least one internal controller or initiator adapter resides. Only a host system having such an I/O controller can be connected to a storage network.

The remaining classes shown in FIG. 5 are not essential to the configuration planning function of storage management program 331. I.e., these classes are used by other storage management functions, such as monitoring. LogicalDisk class 520 and LogicalConn ("Logical Connection") class 521 permit a physical configuration of disks and connections to be represented to the host in a different ("logical") form. E.g., a single physical disk may be partitioned into multiple "logical disk" segments, or multiple disks may be represented as a single large "logical" disk. Alias class 522 contains alias names for physical devices, known to particular hosts. I.e., the same physical device may have different identifiers in different host systems. UnknownDevice class 506 is used to represent physical devices other than those specifically provided for.

Figure 6:
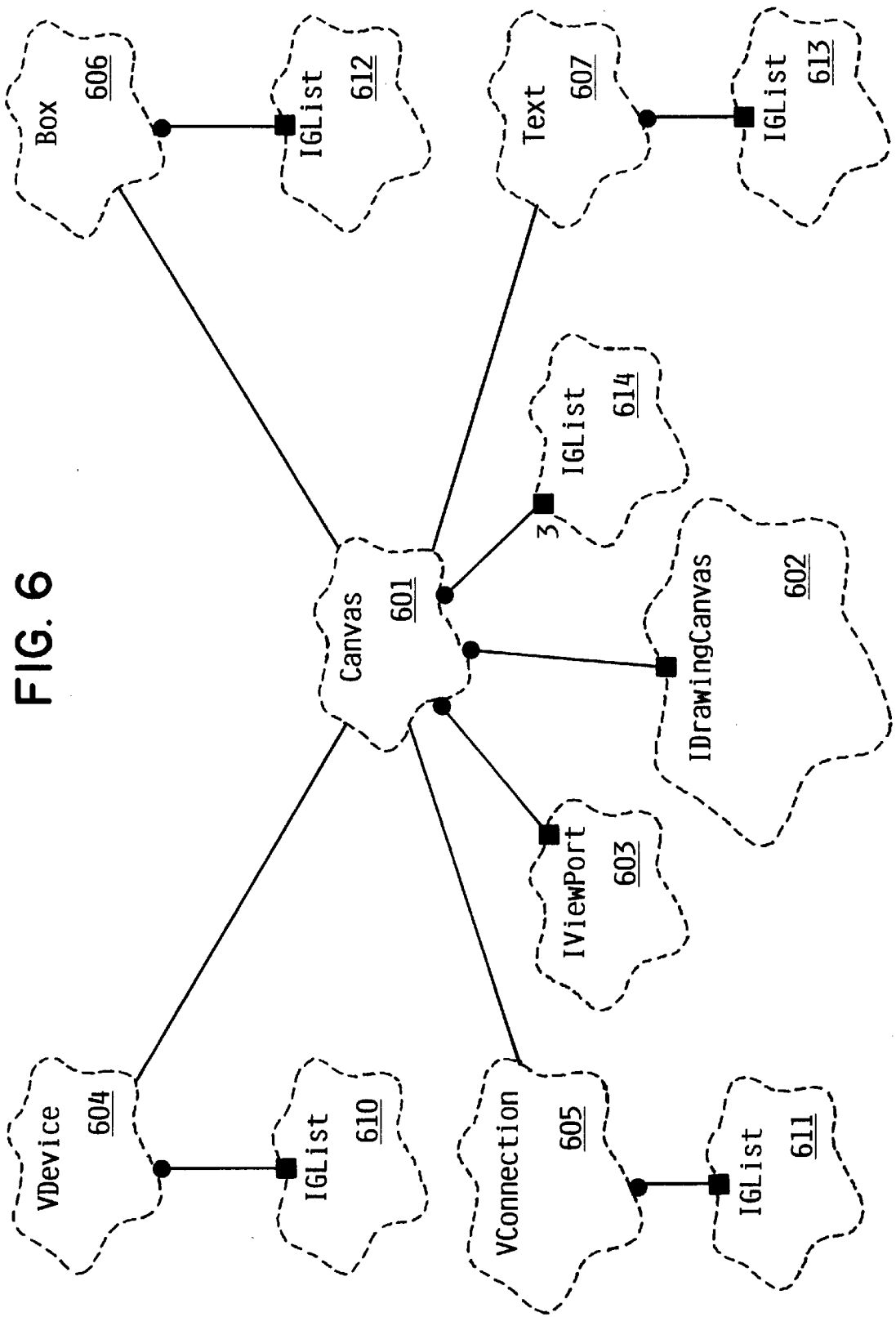
FIG. 6 illustrates a high level view of the canvas related objects which visually represent storage networks, in accordance with the storage management program of the preferred embodiment.

In operation, storage management program 331 presents the user with a virtual "canvas", which can be likened to an artist's canvas, i.e., the area for drawing things. By drawing objects on the canvas, the appropriate configuration information is generated by the program. The class library depicted in FIG. 5 is used internally within storage management program 331 for representing physical devices, connections, and logical relationships. Additional classes are used to generate the graphical display of storage networks on a display screen, for visualization by the user. The structure of these additional classes is shown in FIG. 6.

Canvas class 601 is the base class for holding all objects which define what can be displayed on the display screen.

IDrawingCanvas class 602 contains the current contents of the canvas. The "canvas" is a viutual area for representing storage networks. Typically, the canvas is larger than the size of the physical display screen. As a result, the display screen is capable of displaying only a portion of the complete canvas at any one time.

IViewPort class 603 contains the definition of the "viewport", i.e., the portion of the canvas which is currently visible on the display screen. This portion may be thought of as a movable rectangular viewpoint, which can be placed over any arbitrary section of the canvas. The viewport's location is manipulated by conventional horizontal and vertical scroll bars.

VDevice class 604 contains objects defining the appearance of corresponding network resource devices such as Controller or PhysicalDisk objects. For example, a VDevice object will contain color, size, coordinate location, etc., of a representation of a network resource device.

VConnection class 605 is similar to VDevice class, but contains objects defining the appearance of Connection objects on the screen.

Box class 606 and Text class 607 contain objects which define box and text annotations, respectively. Such annotations have screen location, size and appearance, but unlike VDevice and VConnection objects, have no corresponding object in the class library of FIG. 5. Box and Text objects support annotations which make the screen representation of a storage network easier to understand, but these annotations are not themselves part of the network.

IGList classes 610–614 contain information defining the icons or other graphical images and associated text, which are part of respective VDevice, VConnection, Box, Text and Canvas objects.

Figure 7:
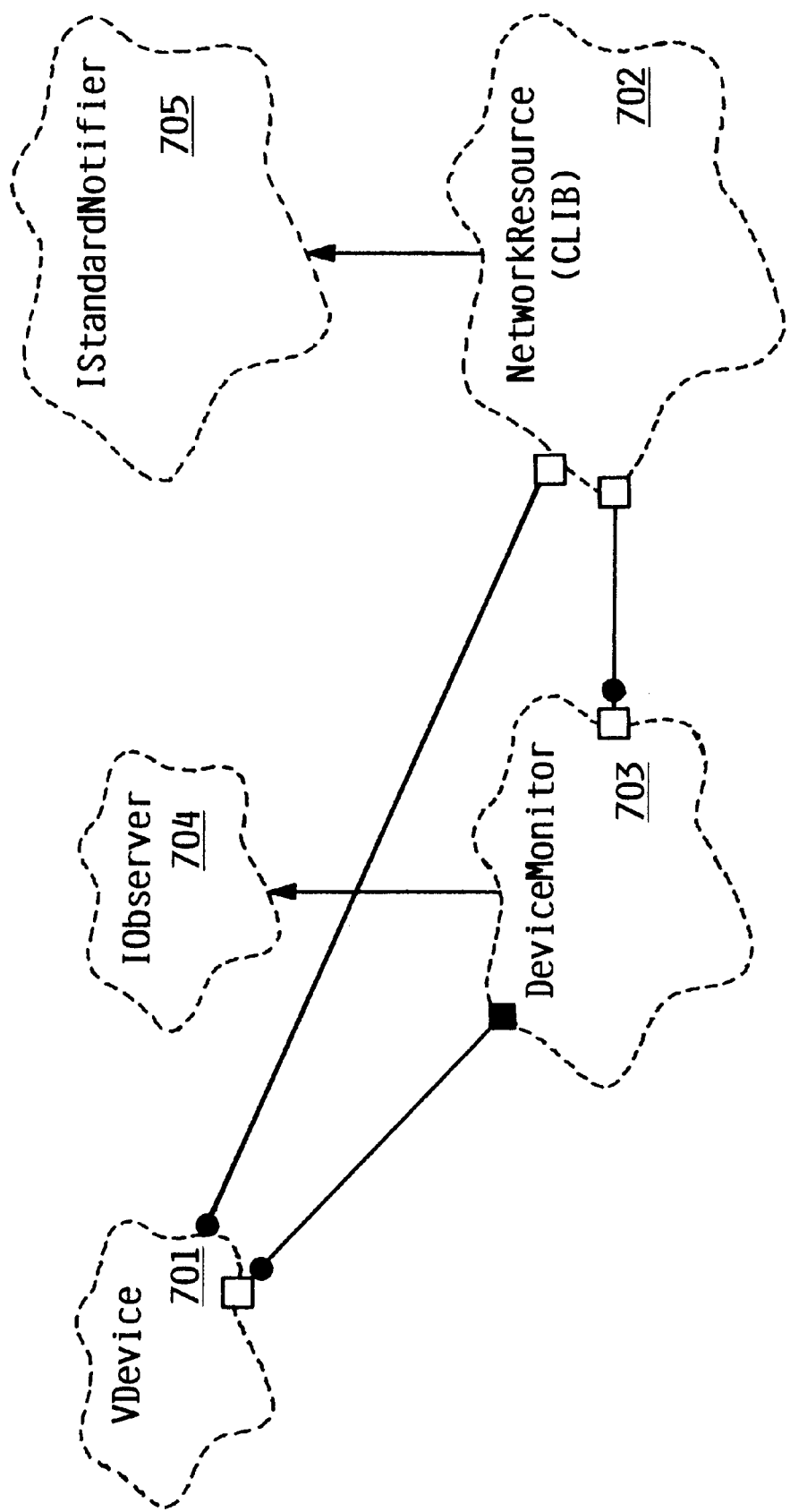
FIG. 7 illustrates the relationship between visual device representation objects and the network resource objects themselves, according to the preferred embodiment.

FIG. 7 illustrates the relationship between VDevice objects and the corresponding network resource objects themselves, according to the preferred embodiment. For each VDevice object 701, there exists a corresponding object 702 which inherits from NetworkResource class 503. NetworkResource, being an abstract class, does not directly contain objects, but objects inheriting from it would include, for example, PhysicalDisk, IntController, Adapter, etc. When storage management program 331 is operating in configuration planning mode, VDevice objects send messages directly to corresponding objects inheriting from NetworkResource. DeviceMonitor object 703 is used only for the storage management program's data gathering and monitoring functions, and can, for example, send a message to a VDevice object causing its screen representation to change in response to some event occurring on the network. IObserver 704 and IStandardNotifier 705 are similarly used only for network data gathering and monitoring.

It will be understood that the above described object-oriented class structures are illustrative of a single embodiment only, and that many variations of data structures are possible. For example, in addition to varying forms of class libraries, the function described herein could have been implemented in conventional procedural code, in which data is encoded in tables, linked lists, or any of various forms. Furthermore, depending on the exact form of the implementation, some attributes or fields may be unnecessary, while additional attributes or fields may be required. It will further be understood that the class structures described above are not necessarily the only class structures used by storage management program 331.

Figure 9:
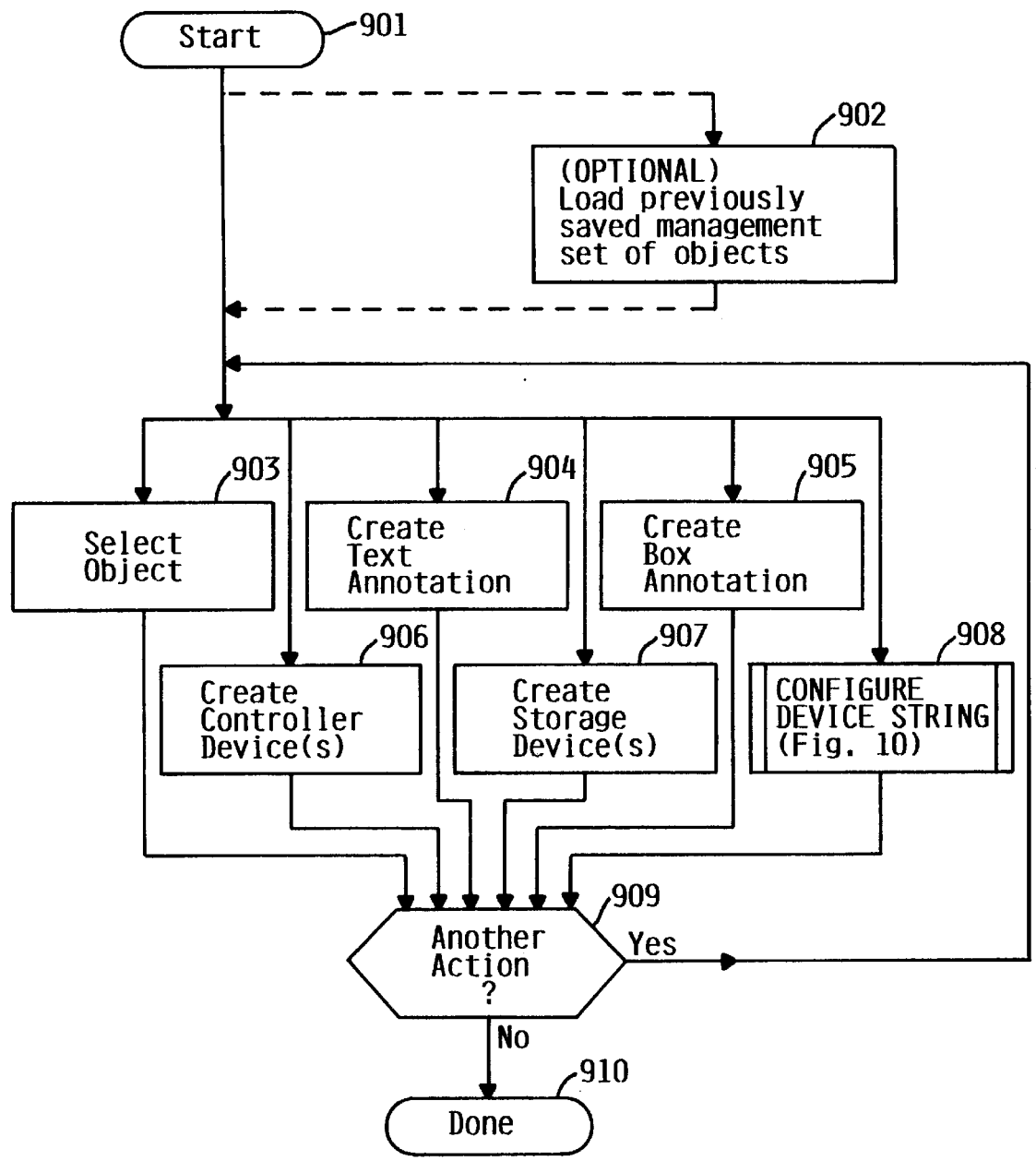
FIG. 9 is a high-level flowchart of the steps performed to plan the configuration of a storage network in accordance with the preferred embodiment.
Figure 10:
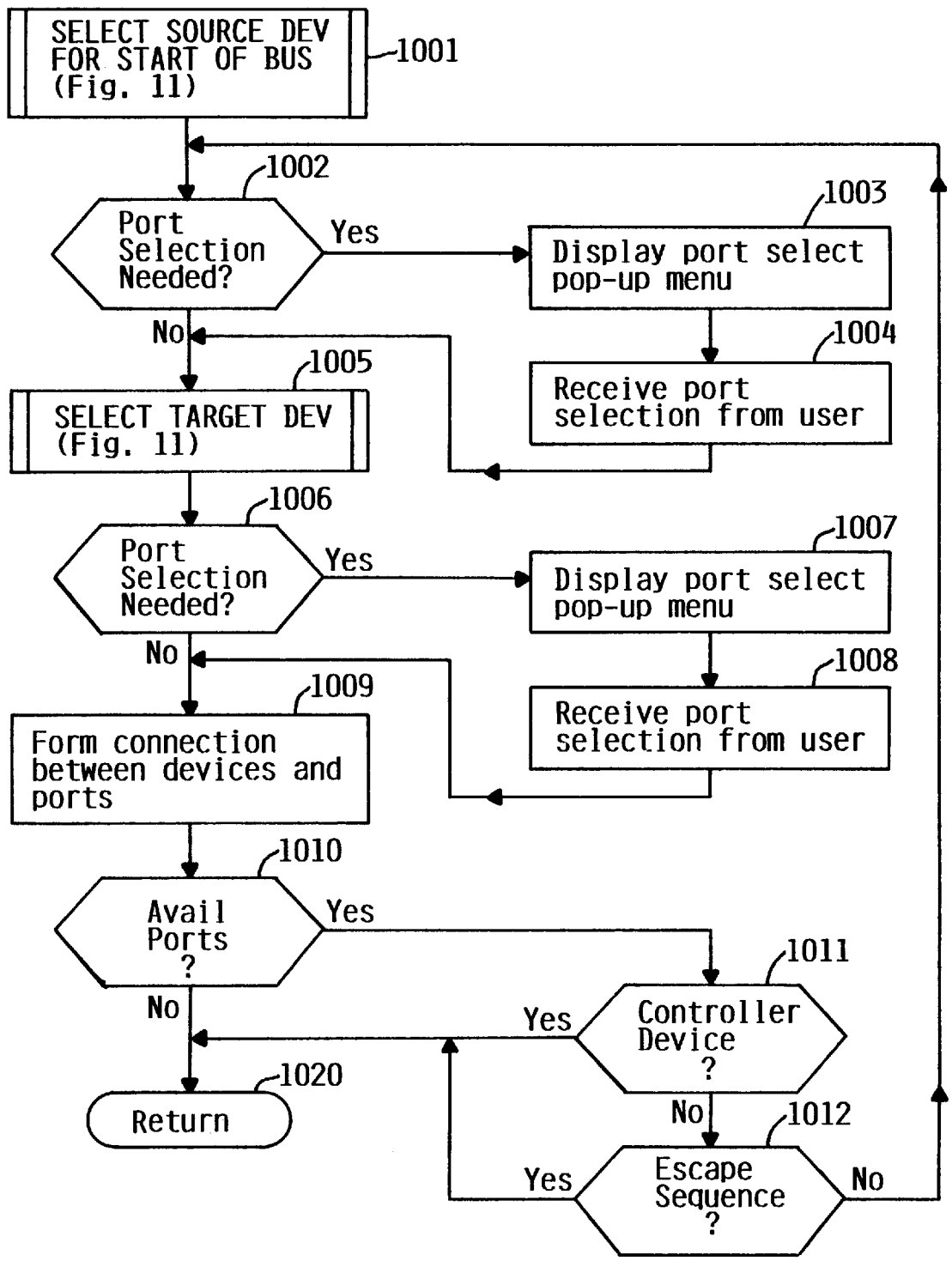
FIG. 10 is a flowchart showing in greater detail the steps performed to plan the configuration of a bus within a storage network, in accordance with the preferred embodiment.
Figure 11:
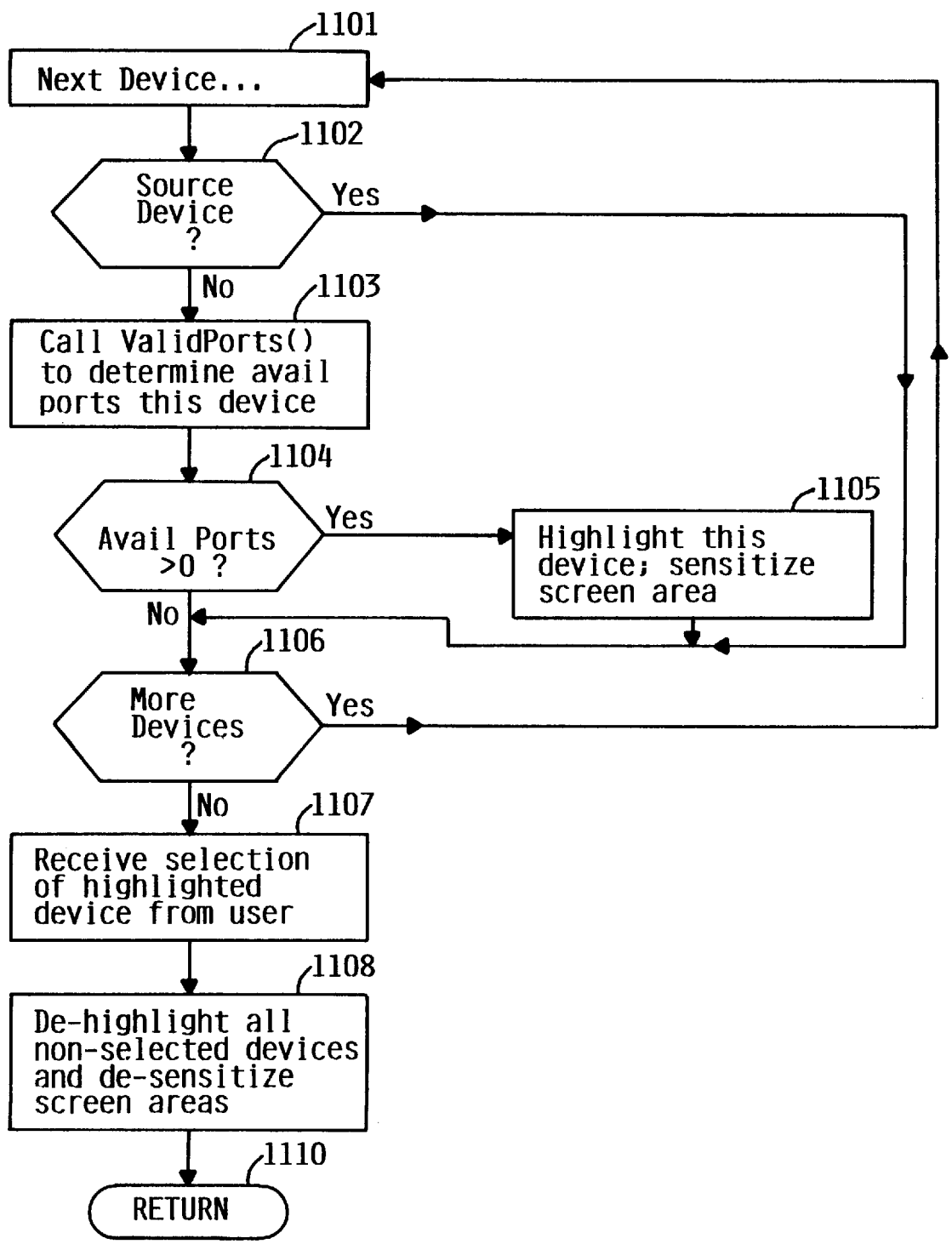
FIG. 11 is a flowchart showing in greater detail the steps performed to select an available device for connection, in accordance with one embodiment of the present invention.

In operation, the storage management program of the preferred embodiment is used to interactively plan a storage network configuration. FIGS. 9–11 illustrate the steps taken to plan the storage network, while FIGS. 12A–12E illustrate the appearance of the display screen for an example configuration task.

FIG. 9 is a high-level flowchart of the steps performed in a storage network configuration task. From an user's perspective, the task is performed by drawing the configuration on a virtual canvas. To begin, the user invokes the planning function of storage management program 331, which presents the user with a blank canvas and associated toolbars, scrollbars, etc. (step 901). As shown in FIGS. 12A–12E, the bulk of the display screen is devoted to the canvas viewport 1250, while toolbars 1251, 1252, scrollbars 1253, 1254, and other objects generally occupy the periphery.

Typically, the user begins the task by specifying the universe of objects to be used in the configuration (i.e., the management set of objects). As shown at step 902, the user can optionally load a previously saved collection of objects as the current management set. Whether or not a previously saved collection is loaded, the user may then create additional devices to complete the management set.

The user can perform any of the tasks 903 through 908 by selecting a corresponding tool from toolbar 1251. While the user can theoretically select tasks in any arbitrary order from toolbar 1251, the user will typically create devices first (steps 906 and 907), configure strings (step 908), and then add annotations (steps 904 and 905).

By selecting icons 1264 or 1265, the user can create one or more controller devices (step 906) or storage devices (step 907), respectively. Selecting either of these icons causes the pointer device to act in the "add device" mode. The selection of an object from the tool bar may cause a pop-up menu to appear, allowing the user to specify further object characteristics. The user moves the pointer to any unoccupied area of the canvas, selects the location, and the corresponding device is placed on the canvas by storage management program 331. Storage management program automatically creates appropriate objects in the client library and canvas to represent the device being created. I.e., if a storage device is being created, a PhysicalDisk object and a VDevice object (representing the appearance of the disk on the user's display screen) are automatically created. In this manner, the user can place one device or many devices of the same type. The pointer device continues to act in the "add device" mode until the user makes another selection from a toolbar.

By selecting icons 1262 or 1263, the user can create one or more text annotations (step 904) or box annotations (step 905), respectively. As in the case of adding devices, the selection of either of these icons causes the pointer device to act in the "add annotation" mode. The user moves the pointer to an appropriate area of the canvas, selects the location, and specifies the text or box. As in the case of adding devices, the user may create one or many annotations while in the "add annotation" mode.

By selecting icon 1261, the pointer acts in a "select object" mode (step 903), such as is typical of a pointer device. The user may use the "select object" mode, e.g., to edit what is already on the canvas (move or remove a device, connection, annotation, etc.).

By selecting icon 1266, the user can create connections between devices. The pointer then acts in a create connections mode, to configure a string of connected devices (step 908), as shown in greater detail in FIGS. 10 and 11. A string of connected devices, or "bus", is the basic unit of the configuration task. As explained previously, the SSA storage network of the preferred embodiment does not use a true "bus", as that term is normally understood in the field of computer communications protocols. An SSA "bus" is a collection of individual bi-directional SSA communications links, in which all devices are linked together. To the host systems, the SSA bus is seen as merely a distributive communications medium behaving like any other bus. Thus, the bus is a construct used by host systems for addressing and data accessing purposes. To the user, the bus construct is transparent. The user simply specifies a string of devices, and storage management program 331 identifies it as a bus, creating a bus object as appropriate. If the user is extending a previously created string, the program will determine whether this extends the previous bus (depending on port numbers assigned or other rules defining the bus), and either create a new bus object or use the existing bus object as appropriate.

The user specifies a string by specifying a series of bidirectional links. Each link is specified by specifying a "source device" and a "target device". For ease of use, program 331 assumes that the source device in a link is the same as the target device of the previous link. Thus, it is unnecessary for the user to select the source device when defining a link (except for the first link in the string). The user specifies the string by selecting source and target devices for the first link, and thereafter selecting only the target device for each subsequent link. Since the SSA protocol supports buses as linked strings, this is an efficient way to specify a bus. However, in an alternative embodiment it would be possible to select source and target devices individually for each link. Additionally, where the communications protocol being used requires or suggests other network topologies, a different methodology may be used. E.g., if a star network is desired, the central device may be selected once as a common source device, followed by selection of multiple target devices FIG. 10 illustrates the steps taken to configure a single string of devices (bus) within a storage network (represented collectively in FIG. 9 as block 908). The bus configuration task begins by selecting one of the available devices as a starting point (step 1001). This starting point will be the "source device" for the first bidirectional link. This device selection process is depicted in greater detail in FIG. 11, and described more fully below. Basically, storage management program 331 automatically determines and highlights the available choices, and receives an user selection from among those choices.

As part of the device selection process (see below), the program determines the number of ports in the selected device which are available for use, i.e., ports not already configured which could be connected without violating some network constraint. If the number of available ports is greater than 1, it may be necessary to prompt the user for a port selection. In the hardware used in the preferred embodiment, a port selection is necessary if more than one port is available on an I/O controller, but not necessary if multiple ports are available on a storage device. It will be understood that different hardware may have differing port and addressing constraints. If a port selection is necessary (step 1002), the program causes a pop-up menu to appear on the display by making an appropriate call to operating system 321 (step 1003).

Figure 12A:
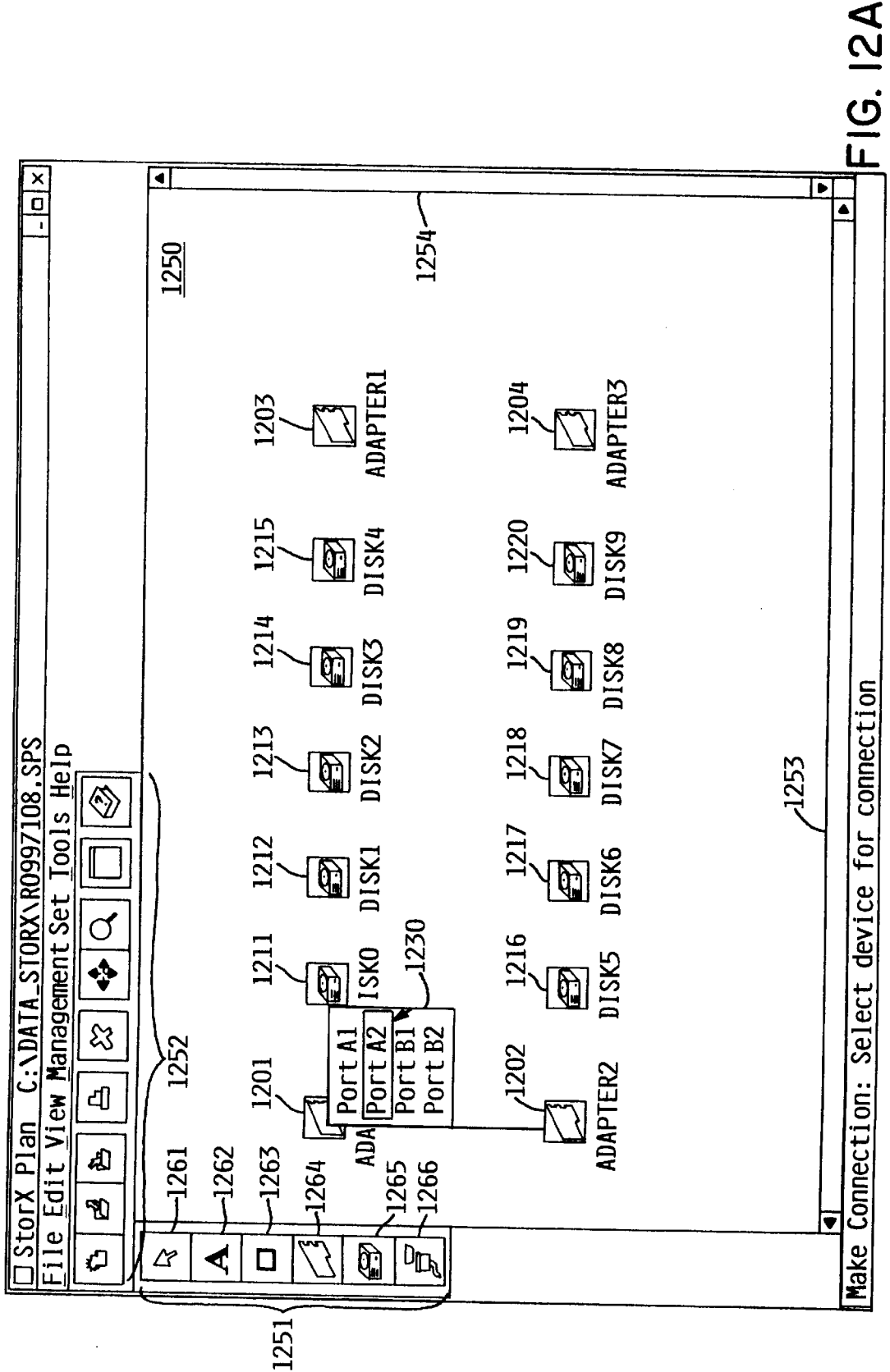
FIGS. 12A through 12E illustrate the appearance of the display screen at various stages of planning a bus configuration, according to the preferred embodiment.

FIGS. 12A–12E show the appearance of the display screen at various stages of an example bus configuration task, in which four internal I/O controllers 1201–1204 and ten storage devices 1211–1220 are represented on the screen. FIG. 12A represents the appearance of the screen after the program performs step 1003, but before performing step 1004. In this example, a connecting link has already been specified between controllers 1201 and 1202. The user has selected controller 1201 as the first device of a bus. The program has determined that three ports (ports A2, B1 and B2) are available on controller 1201. It therefore presents pop-up menu 1230 at step 1003. Note that port A1 appears in lightened form, indicating that it is not available as a choice.

The user selects a port from pop-up menu 1230 by moving the pointer to the menu and clicking on one of the displayed ports (step 1004). Operating system 321 handles the pointer input and returns the appropriate port information. The port selected is then taken as the source port for the current connecting link. If, at step 1002, there had been only one port available, the program would have taken this only port as the source port, without presenting a pop-up menu to the user. In either case, the program then allows the user to select a target device at step 1005.

A target device for the current connecting link is selected in much the same manner as the starting point source device. This process is depicted in FIG. 11. Basically, the program looks at its available pool of device, determines which ones can validly be selected, and highlights the available device choices for the user, allowing the user to specify a device with the pointer. At step 1101, the storage management program chooses any device object (i.e., a Controller object or a PhysicalDisk object) from the pool of device objects linked to the current network image object. If the device chosen is the source device (step 1102), the device is ignored, and the program skips to step 1106 to consider another device. The configuration proceeds by specifying a chain of links, each link in the chain starting from where the previous link ended. Thus, the "source device" is the device that was previously chosen as the target of a link selection (except in the case of the first link, when the source device must also be selected).

The program then determines the number of available ports on the currently considered device by calling the method ValidPorts( ), associated with the class Device (step 1103). ValidPorts( ) returns the number of ports in the current device which are available to form a connection. If ValidPorts=0, the device itself is not available to form a connection, while a non-zero value indicates some connection can be made.

ValidPorts( ) is responsible for verifying that all applicable network constraints are being met. I.e., ValidPorts( ) considers each port object (representing a physical port) associated with the current device, and confirms whether a hypothetical connection to the current device object at the port object would violate any network constraint. In the preferred embodiment, SSA network constraints include (a) limitations on port numbers assigned to certain buses; (b) limits on the number of devices of certain types; and (c) limits on the total number of devices in a given bus. However, it will be understood that applicable network constraints could include many other factors, for example: (a) the physical location of a source device with respect to a target device; (b) the total data capacity of a bus or network; (c) compatibility of certain types of devices with other types; etc.

If Validports( ) returns a non-zero value (step 1104), there is at least one port available for connection from/to the current device. The program then causes the screen representation of the current device to be highlighted by making a call to the appropriate function in operating system 321 (step 1105). At the same time, the program sensitizes an area of the display screen in the vicinity of the screen representation of the device, so that a pointer selection within that area will operate as an user selection of the represented device. The program then determines whether there are any more device objects linked to the network image object (step 1106), and if so repeats steps 1101–1105. If, on the other hand, Validports( ) returned a zero value for the current device, step 1105 would have been skipped, because a connection to/from the current device is not allowed.

Figure 12B:
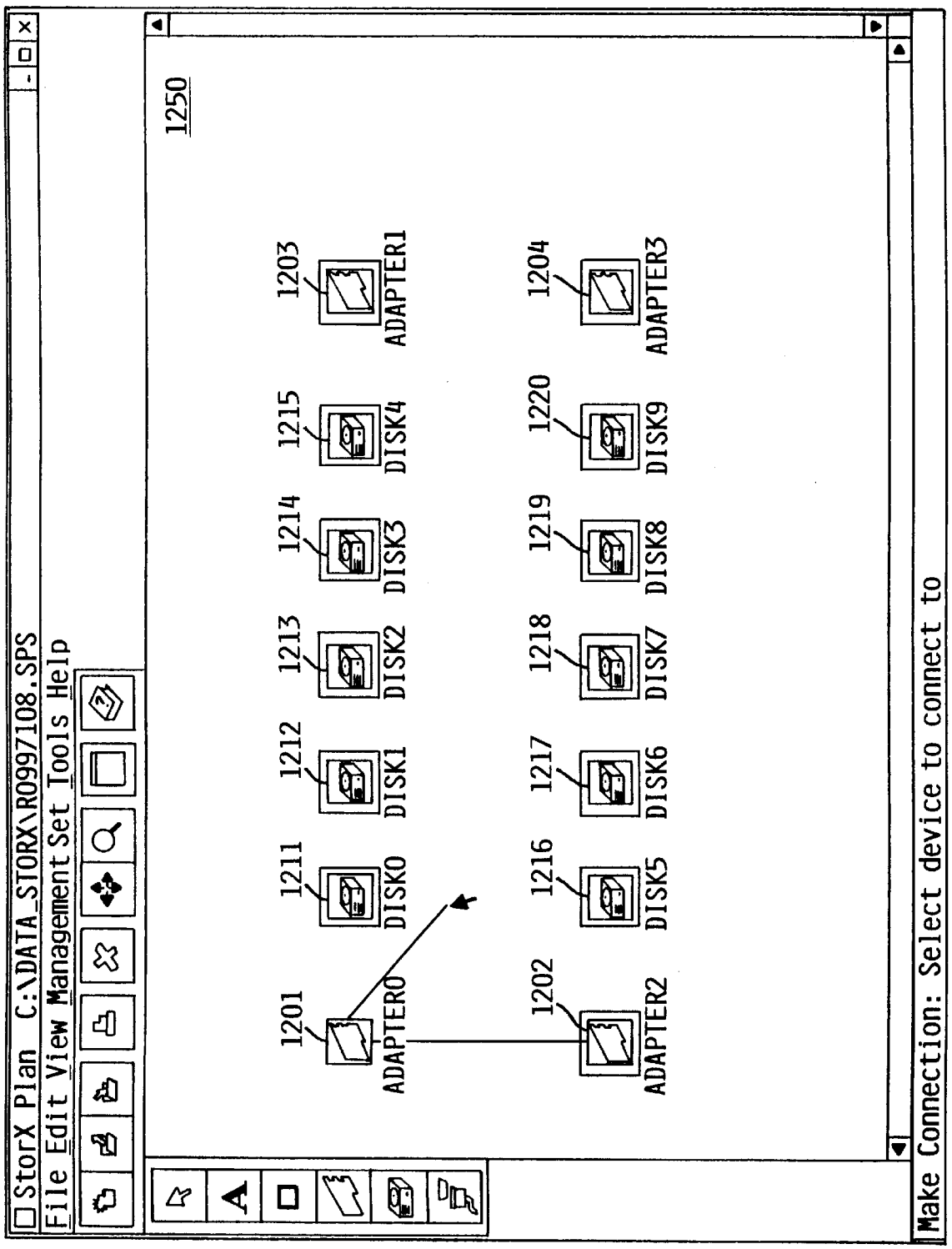
Figure 12C:
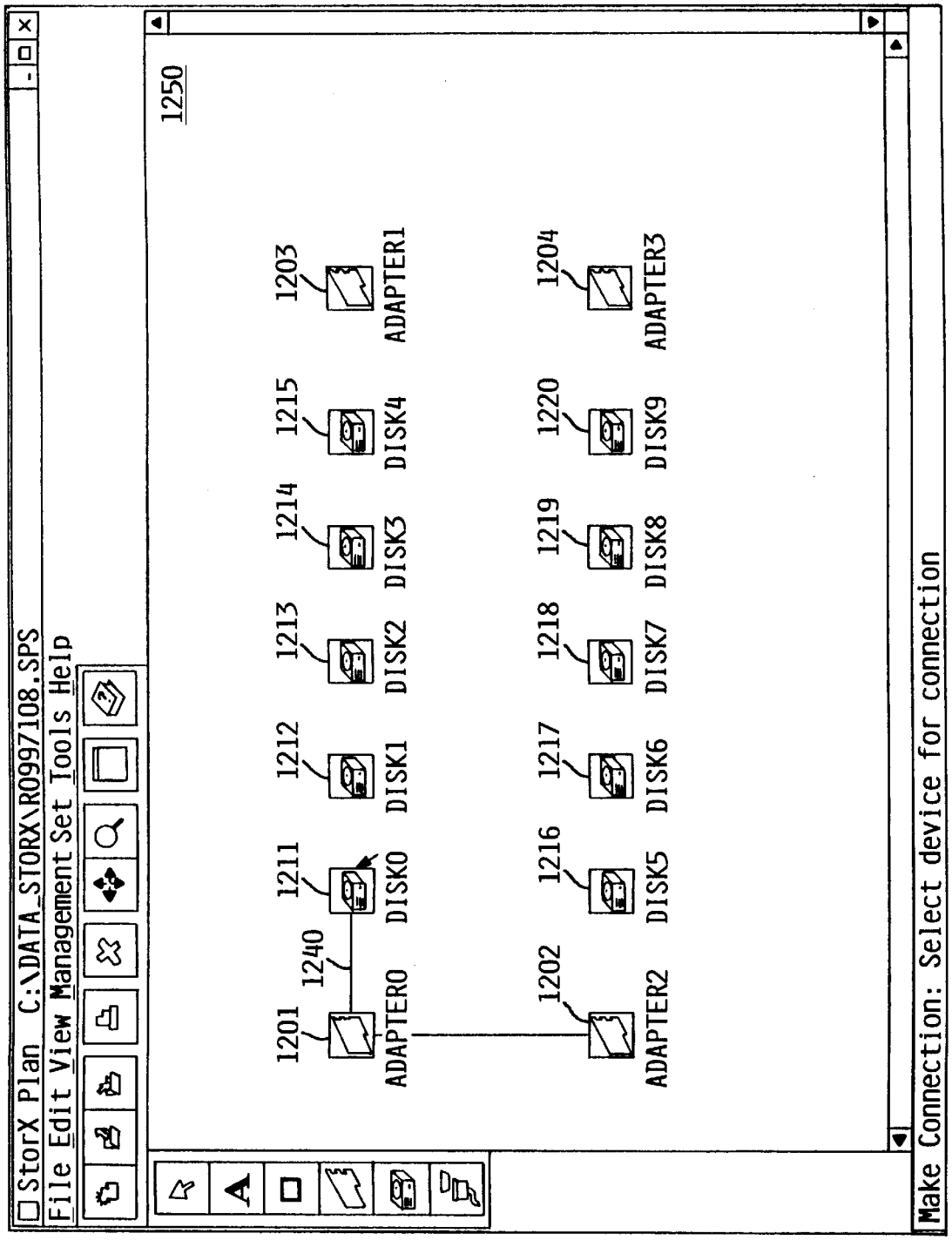

When no more device objects remain in the pool of objects linked to the network image object (step 1106), the program waits to receive the user selection of a device (step 1107). FIG. 12B shows the appearance of the display screen after the program has determined the available devices (steps 1101–1106), but before receiving a user selection. In FIG. 12B, controllers 1202–1204 are highlighted, as are storage devices 1211–1220. It is thus possible for the user to select any of the highlighted devices. (In FIGS. 12B and 12D, "highlighting" is shown as a shaded ring around the icon for clarity of illustration. Preferably, highlighting is achieved by using a high intensity color, but this would be difficult to illustrate on a black-and-white drawing. However, it should be understood that "highlighting" can be achieved by any method which displays the icon in a distinctive form.) A line connects the source device (controller 1201) with the current position of the pointer. The user selects one of the highlighted devices on the display screen by moving the pointer to the screen representation of the device and indicating a selection, as by pressing a button on a mouse. The selection having been made by the user, the program then de-highlights the represented devices and de-sensitizes the screen areas (step 1108). FIG. 12C shows the appearance of the display screen after the user has selected storage device 1211 as the target device for the connection.

Having finished selecting the target device (represented as step 1005), the program then considers whether a port selection is necessary (step 1006). As explained above with reference to step 1002, if only one port is available in the target device, or if the target device does not differentiate ports, there is no need to ask the user for a port selection. If a port selection is necessary, the program branches to step 1007 to again present a pop-up menu of available port options, and step 1008 to receive the user selection of a port.

After any necessary port selection has been made, the program forms a connection between the source and target devices at the appropriate ports (step 1009). Forming a connection means that a Connection object is created, appropriately linked to the current Bus object, and to the appropriate Port objects of the source and target devices. This connection is displayed on the display screen as a solid line between the source and target devices. As shown in FIG. 12C, connection 1240 has been formed between controller 1201 (the source device) and disk storage device 1211 (the target device).

Figure 12D:
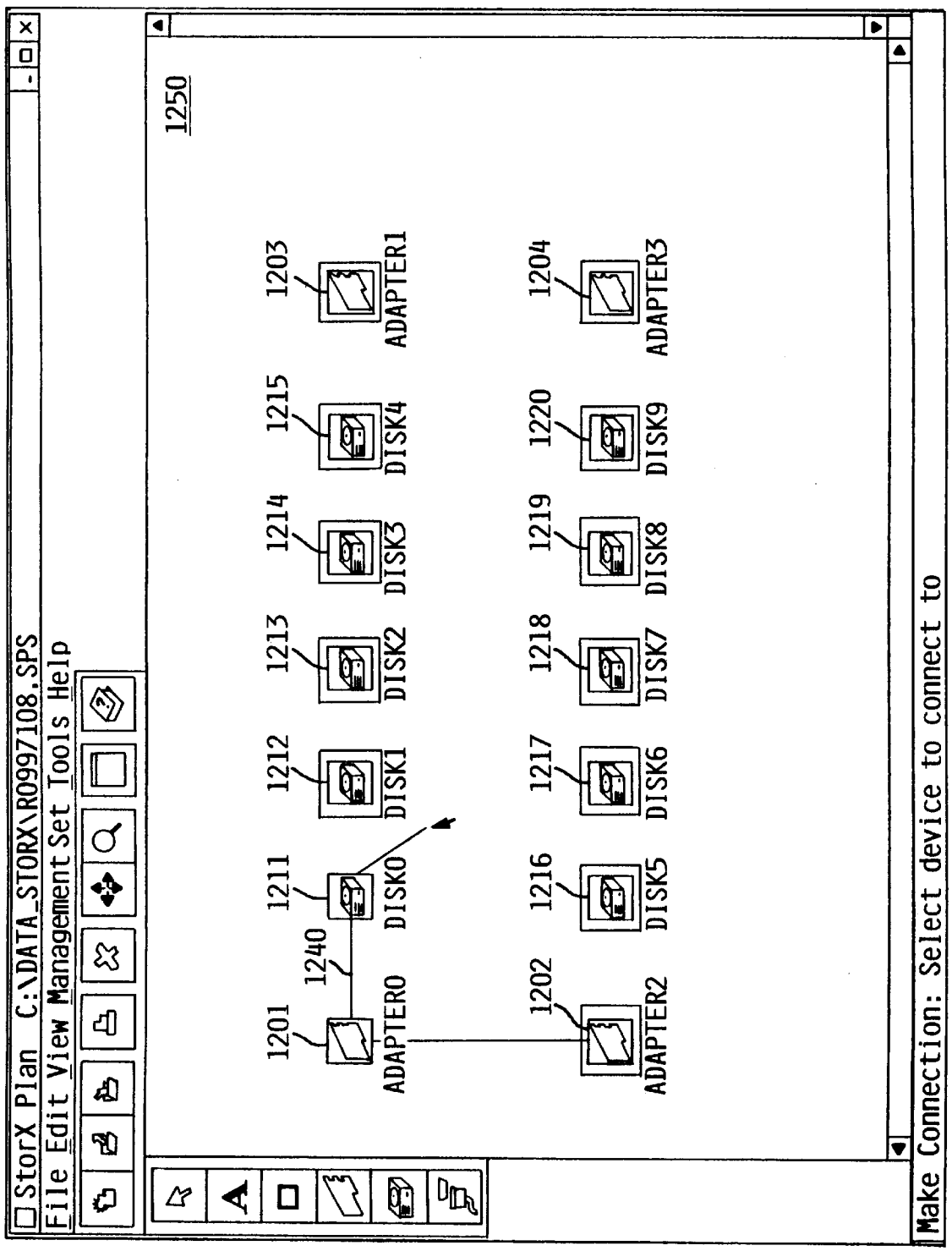

Under certain conditions (represented as branches from blocks 1010, 1011, 1012), the bus configuration will terminate. These are explained more fully below. Normally, the bus configuration task continues by specifying another link, as represented by returning to block 1002, and repeating steps 1002–1009. It will be observed that in this case step 1001, specifying a source device, is not performed. Normally, it is assumed that a bus will be configured as a string of individual bi-directional links, each link starting where the last link left off. Therefore, the target device for the previously specified link becomes the source device for the next link to be specified. In this manner, it is not necessary for the user to specify source and target for every link, the source usually being assumed. By making this assumption, the program saves the user time in the configuration task, and reduces the probability of error because a chain of links is normally the preferred configuration. However, the user could override this assumption being made by the program by terminating the bus configuration task and selecting another source device for additional configuration of the same bus or a different bus. FIG. 12D shows the appearance of the display screen after the user has specified link 1230, and now moves the pointer from the previously specified target device 1211. Note that in FIG. 12D, various devices other than disk drive 1211 are now highlighted, and a solid line follows the pointer to indicate that a connection may be made to any of the highlighted devices by simply moving the pointer to the device and selecting it.

The bus configuration task ends upon the occurrence of any of several conditions, represented in FIG. 10 by blocks 1010–1012. If there are no more available ports on the target device that was just selected for the most recent link (step 1010), it is impossible to continue the current chain of links, and so the task ends. Because a chain of links usually goes from one I/O controller to another, the program assumes the end of the chain if the most recent target device is a controller (step 1011), and again the task ends. Finally, the user can specify the end of a chain of links at any time by inputting an appropriate escape sequence from a keyboard or pointing to and clicking on a blank area of the canvas (step 1012). Under any of these conditions, configuration of the current chain of links ends, and the program returns to step 909. The user may then select another action from the toolbar. In particular, the user may elect to configure another bus string (or add links to the current bus starting from another device) by again selecting the create connections icon 1266.

Figure 12E:
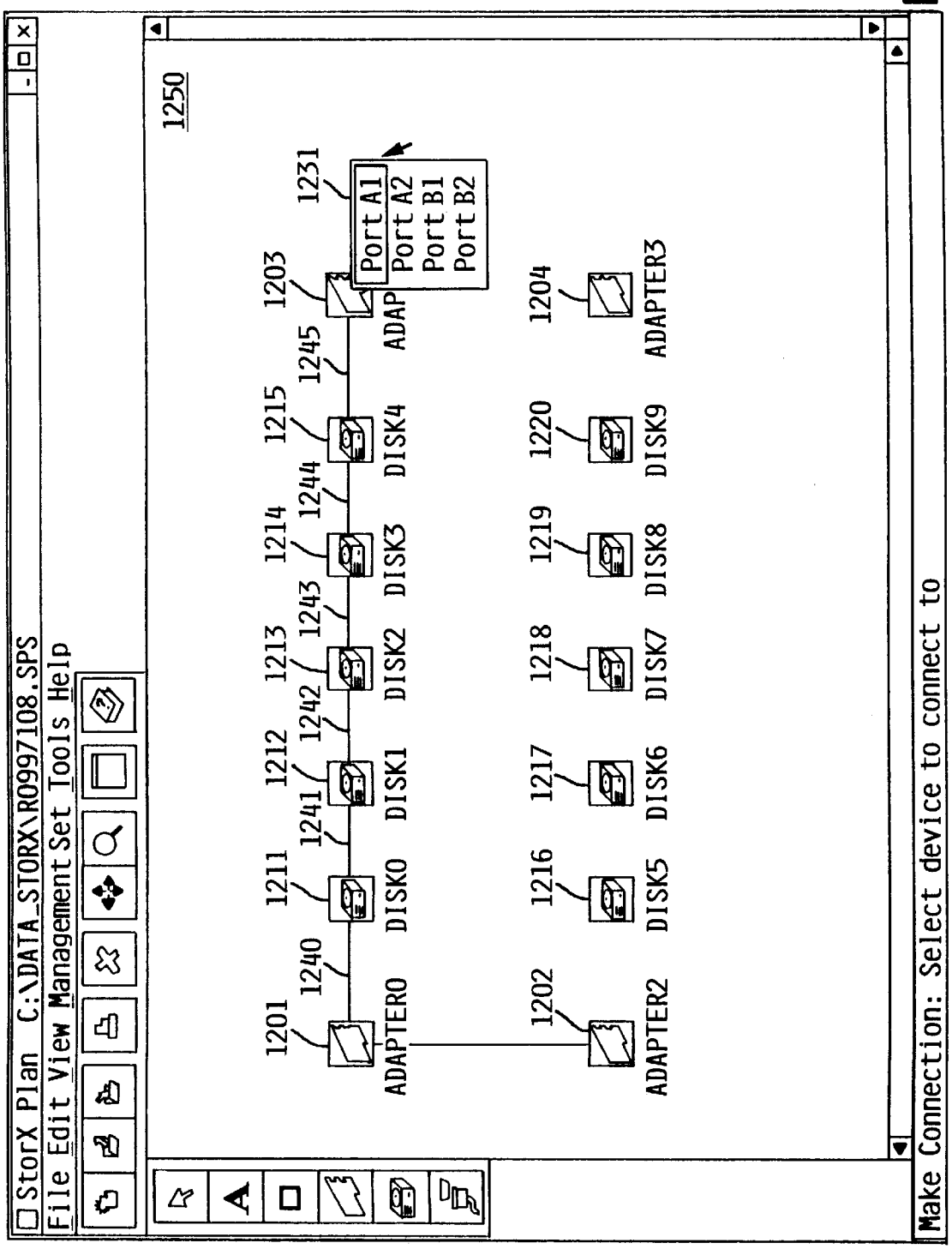

FIG. 12E shows the appearance of the display screen in the example bus configuration task, after several links 1240–1245 have been specified connecting controller 1201, storage devices 1211–1215, and controller 1203. The user is required to specify a port for controller 1203 from pop-up menu 1231. Because the target device of the most recent connection was a controller, the program assumes an end of the bus (taking the "yes" branch from step 1011). However, if the user chose, he could continue this bus to some other device by again selecting icon 1266.

The user repeats steps 903–908 as necessary to complete the configuration of a storage network (step 909). The user may select other options from toolbar 1252, such as saving the configuration, printing a hardcopy of the canvas, etc. Storage management program 331 may offer the option to save/print a configuration in various forms. For example, one form of output may be a list of instructions for the installer of the storage network. Another form of output may be a graphical illustration of the network. Another form may be a list of addresses and paths for use by a host computer system in accessing storage devices connected to the network. Any of these would typically be done after completion of all configuration, i.e., at step 910, but may be performed at intermediate stages as well.

While storage management program 331 is shown in FIG. 3 residing in a random access memory of a host computer system, it will be understood that such a storage management program for a storage network may be embodied as a sequence of processor-executable instructions stored on a computer readable medium, for sale or other distribution as a computer program product. The medium may include, by way of example, a magnetic floppy disk, magnetic tape, CD-ROM disk, or other medium. Furthermore, storage management program 331 may be transmitted by electronic means, such as the Internet, for downloading into a memory or storage device of a host computer system.

In accordance with the preferred embodiment of the present invention, a storage network conforming to the IBM SSA protocol is configured, the network having disk storage devices and I/O controllers. However, it will be understood that alternative protocols and devices could also be used. For example, RAID controllers which may reside within a host system or a remote storage cabinet may be configured. Storage devices of differing types, such as tape and optical storage, may be used. Optical libraries comprising multiple optical disks retrievable by one or more retrieving mechanisms may be used. Different communications protocols may be used. Communications adapters or gateways which allow different buses, rings or other networks to communicate with each other, may be configured.

In accordance with the preferred embodiment, a program for interactively planning a storage network configuration is part of a more comprehensive program for managing storage networks, which include data gathering and monitoring functions as well. However, the planning function could be a stand-alone program. Such a program could execute on a computer system linked to the storage network, or on a totally separate system. Output from the program could be in the form of human-readable diagrams and instructions, or configuration instructions readable by another computer system, or both.

In accordance with the preferred embodiment of the present invention, a storage management program is used to interactively plan the configuration of a storage network by graphically representing devices and options available. However, the configuration techniques described herein could also be applied to the configuration of other networks of devices which communicate with each other, and may be applicable to information processing networks generally. For example, local area networks of computer systems could be configured. Naturally, the types of devices and applicable constraints will vary in such cases.

Although a specific embodiment of the invention has been disclosed along with certain alternatives, it will be recognized by those skilled in the art that additional variations in form and detail may be made within the scope of the following claims:

We claim:

1. A method for interactively configuring a storage network, comprising the steps of:
    (a) generating a graphical configuration display to a user, said graphical configuration display representing available storage network devices to be configured, said devices representing configuration choices for a configuration step;
    (b) interactively selecting a configuration choice by selecting one or more of said represented available storage network devices with a pointer, thereby specifying a configuration step;
    (c) incrementally updating said configuration display to depict the configuration step specified by step (b) and the available storage network devices to be configured after performing the configuration step performed by step (b); and
    (d) repeating steps (b) through (c) until said storage network is configured.

2. The method for interactively configuring a storage network of claim 1, wherein said step of interactively selecting a configuration choice comprises the steps of:

(b1) interactively selecting a first device to form a first end of a storage network connection;

(b2) automatically determining, from among a plurality of configurable devices, a plurality of target devices, said target devices being devices which may be connected to said first device;

(b3) displaying said target devices on said display in a distinctive form; and (b4) interactively selecting a second device to form a second end of said storage network connection from the plurality of target devices.

3. The method for interactively configuring a storage network of claim 2, wherein:

said storage network comprises at least one string of successive links, each link connecting a single source device to a single target device; and said step (b4) of interactively selecting a second device to form a second end of an Nth storage network connection implicitly performs said step (b1) of interactively selecting a first device to form a first end of an (N+1)th storage network connection.

4. The method for interactively configuring a storage network of claim 1, wherein said step of interactively selecting a configuration choice further comprises the steps of:

automatically determining whether more than one available port exists in at least one selected represented available storage network device;

prompting a user for a port selection responsive to a determination that more than one available port exists; and interactively receiving a port selection from said user.

5. The method for interactively configuring a storage network of claim 1, further comprising the steps of:

generating a display of a tool bar having a plurality of choices, at least some of said choices representing network devices of different types;

interactively selecting with a pointer one of said choices representing network devices of a first type;

interactively selecting with a pointer a first location on said display for placement of a representation of a first device of said first type; and automatically generating a representation of said first device of said first type at said first location in response to said steps of interactively selecting one of said choices and interactively selective a first location.

6. The method for interactively configuring a storage network of claim 5, further comprising the steps of:

interactively selecting with a pointer a second location on said display for placement of a representation of a second device of said first type, without returning to said tool bar for selecting one of said choices; and automatically generating a representation of a second device of said first type at said second location in response to said step of interactively selecting said second location.

7. A computer program product for interactively configuring a storage network, said computer program product including a plurality of computer executable instructions stored on a computer readable medium, wherein said instructions, when executed by said computer, cause the computer to perform the steps of:

(a) generating a graphical configuration display to a user, said graphical configuration display representing available storage network devices to be configured, said devices representing configuration choices for a configuration step;

(b) interactively receiving a configuration choice selection from a user, said selection being made by selecting one or more of said represented available storage network devices with a pointer, thereby specifying a configuration step;

(c) incrementally updating said configuration display to depict the configuration step specified by step (b) and the available storage network devices to be configured after performing the configuration step performed by step (b); and (d) repeating steps (b) through (c) until said storage network is configured.

8. The computer program product for interactively configuring a storage network of claim 7, wherein said step of interactively receiving a configuration choice selection from a user comprises the steps of:

(b1) interactively receiving a first device selection from said user, said first device to form a first end of a storage network connection;

(b2) automatically determining, from among a plurality of configurable devices, a plurality of target devices, said target devices being devices which may be connected to said first device;

(b3) displaying said target devices on said display in a distinctive form; and (b4) interactively receiving a second device selection from said user, said second device to form a second end of said storage network connection, said second device being selected from the plurality of target devices.

9. The computer program product for interactively configuring a storage network of claim 8, wherein:

said storage network comprises at least one string of successive links, each link connecting a single source device to a single target device; and said step (b4) of interactively receiving a second device selection to form a second end of an Nth storage network connection implicitly performs said step (b1) of interactively receiving a first device selection to form a first end of an (N+1)th storage network connection.

10. The computer program product for interactively configuring a storage network of claim 7, wherein said step of interactively selecting a configuration choice further comprises the steps of:

automatically determining whether more than one available port exists in at least one of said first device and said second device;

prompting a user for a port selection responsive to a determination that more than one available port exists; and interactively receiving a port selection from said user.

11. The computer program product for interactively configuring a storage network of claim 7, wherein said instructions, when executed by said computer, further cause the computer to perform the steps of:

generating a display of a tool bar having a plurality of choices, at least some of said choices representing network devices of different types;

receiving a selection of one of said choices representing network devices of a first type, the selection being made interactively with said pointer;

receiving a selection of a first location on said display for placement of a representation of a first device of said first type, the selection being made interactively with said pointer; and automatically generating a representation of said first device of said first type at said first location in response to said steps of receiving a selection of one of said choices and receiving a selection of a first location.

12. The computer program product for interactively configuring a storage network of claim 11, wherein said instructions, when executed by said computer, further cause the computer to perform the steps of:

receiving a selection of a second location on said display for placement of a representation of a second device of said first type, said selection being made interactively with said pointer and without returning to said tool bar for selecting one of said choices; and automatically generating a representation of a second device of said first type at said second location in response to said step of receiving a selection of a second location.

13. A method for interactively configuring an information processing network, comprising the steps of:

(a) generating a graphical configuration display to a user, said graphical configuration display representing a plurality of available devices to be configured;

(b) interactively selecting a representation of a first device with a pointer, said first device to form a first end of a network connection;

(c) automatically determining, from among a plurality of devices, a plurality of connectable devices, said connectable devices being devices which may be connected to said first device;

(d) displaying said representations of said connectable devices in a distinctive form;

(e) interactively selecting with a pointer, from the representations of connectable devices, a representation of a second device, said second device to form a second end of said network connection, thereby specifying a network connection;

(f) incrementally updating said configuration display to depict the plurality of devices having the connection specified by steps (b) through (e);

(g) repeating steps (b) through (f) until said network is configured.

14. The method for interactively configuring an information processing network of claim 13, wherein:

said network comprises at least one string of successive links, each link connecting a single source device to a single target device; and said step (e) of interactively selecting a representation of a second device to form a second end of an Nth network connection implicitly performs said step (b) of interactively selecting a representation of a first device to form a first end of an (N+1)th network connection.

15. The method for interactively configuring an information processing network of claim 13, further comprising the steps of:

automatically determining whether more than one available port exists in at least one of said first device and said second device;

prompting a user for a port selection responsive to a determination that more than one available port exists; and interactively receiving a port selection from said user.

16. A network configuration planning apparatus, comprising:

a processor;

a memory system;

an interactive display for displaying graphical information to a user and receiving selections from a pointing device;

means for generating a graphical image of said network on said interactive display from a representation of a network configuration in said memory system, said graphical image including representations of configuration choices;

means for receiving selections of configuration choices from said pointing device, each said configuration choice specifying a respective one of a sequence of configuration steps; and means for incrementally updating said representation of a network configuration in said memory system with each said configuration step; and means for incrementally updating said graphical image responsive to incrementally updating said representation of a network configuration.

17. The network configuration planning apparatus of claim 16, wherein said network is a storage network comprising a plurality of data storage devices.

18. The network configuration planning apparatus of claim 16, further comprising:

means for determining configuration choices available to said user which satisfy at least one constraint; and means for displaying said configuration choices which satisfy at least one constraint in a distinctive form.

* * * * *

UNITED STATES PATENT AND TRADEMARK OFFICE
CERTIFICATE OF CORRECTION

PATENT NO. : 6,009,466

DATED : December 28, 1999

INVENTOR(S) : Gary T. Axberg et al

It is certified that error appears in the above-identified patent and that said Letters Patent is hereby corrected as shown below:

IN THE ABSTRACT

Line 21 - "valious" should be --various--.

Signed and Sealed this

Thirty-first Day of October, 2000

Attest:

Q. TODD DICKINSON

*Attesting Officer*   *Director of Patents and Trademarks*